(12) United States Patent
Yuki

(10) Patent No.: US 8,558,954 B2
(45) Date of Patent: Oct. 15, 2013

(54) VIDEO DISPLAY DEVICE, VIDEO DISPLAY SYSTEM, AND VIDEO DISPLAY METHOD

(75) Inventor: Taichi Yuki, Tokyo (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/618,904

(22) Filed: Nov. 16, 2009

(65) Prior Publication Data

US 2010/0128180 A1    May 27, 2010

(30) Foreign Application Priority Data

Nov. 26, 2008 (JP) ................................ 2008-301446

(51) Int. Cl.
*H04N 5/445* (2011.01)
*H04N 5/44* (2011.01)
*H04N 7/14* (2006.01)
*H04N 5/765* (2006.01)

(52) U.S. Cl.
USPC ........ 348/564; 348/563; 348/14.02; 348/734; 386/231

(58) Field of Classification Search
None
See application file for complete search history.

(56) References Cited

U.S. PATENT DOCUMENTS

| | | | |
|---|---|---|---|
| 2005/0200695 A1* | 9/2005 | Maeda | 348/14.02 |
| 2006/0093310 A1* | 5/2006 | Hung | 386/46 |
| 2008/0055470 A1* | 3/2008 | Garg et al. | 348/564 |
| 2010/0066919 A1* | 3/2010 | Nakajima et al. | 348/734 |

FOREIGN PATENT DOCUMENTS

| | | |
|---|---|---|
| JP | 11-187329 | 7/1999 |
| JP | 11-266408 | 9/1999 |
| JP | 2001-36836 | 2/2001 |
| JP | 2001-61116 | 3/2001 |
| JP | 2002-44556 | 2/2002 |
| JP | 2003-9013 | 1/2003 |
| JP | 2003-116073 A | 4/2003 |
| JP | 2004-88621 A | 3/2004 |
| JP | 2006-108929 | 4/2006 |
| JP | 2006-245703 | 9/2006 |
| JP | 2008-61065 A | 3/2008 |
| JP | 2008-270962 A | 11/2008 |

OTHER PUBLICATIONS

Office Action issued Dec. 4, 2012 in Japanese Patent Application No. 2008-301446.

* cited by examiner

*Primary Examiner* — Jefferey Harold
*Assistant Examiner* — Sean Haiem
(74) *Attorney, Agent, or Firm* — Oblon, Spivak, McClelland, Maier & Neustadt, L.L.P.

(57) ABSTRACT

A video display device including:
an external tuner video reception unit that obtains, from an external device having a reception tuner to receive a video signal, a video signal received by the reception tuner;
an internal reception tuner that receives a video signal;
a video control unit that controls so that the external tuner video reception unit receives a video signal of each channel; and
a display control unit that controls to display a video signal received by the external tuner video reception unit in real time and the video signal received by the internal reception tuner at the same time on a screen.

11 Claims, 13 Drawing Sheets

VIDEO DISPLAY DEVICE, VIDEO DISPLAY SYSTEM, AND VIDEO DISPLAY METHOD

BACKGROUND OF THE INVENTION

1. Field of the Invention

The present invention relates to a video display device, a video display system and a video display method.

2. Description of the Related Art

Recently, video display devices such as a television receiver have been diversified. Users thus can acquire various information using the various functions installed in those video display devices. As the functions installed in the video display device, for example, there is a function for displaying a program schedule on a screen of the video display device. For example, a technology to display a list of text information related to available videos of respective channels is disclosed in Japanese Patent Application Laid-Open No. 1999-187329, 1999-266408, 2003-9013, 2006-108929, and 2006-245703.

Further, a technology to display available videos of respective channels as icons is disclosed in Japanese Patent Application Laid-Open No. 2001-36836, 2002-44556, and 2001-61116.

SUMMARY OF THE INVENTION

However, in a related method, it has been difficult to display a list of available videos of plural channels and display real-time moving videos being broadcasted in the respective channels. Displaying a list of information on real-time moving videos can be realized when plural tuners are equipped in a video display device, for example. However, an extremely high manufacturing cost is required to realize such a video display device.

The present invention has been made in views of the above issues and it is desirable to provide a video display device capable of displaying a list of real-time video signals of respective channels while maintaining the low manufacturing cost.

According to an embodiment of the present invention, there is provided a video display device including: an external tuner video reception unit that obtains, from an external device having a reception tuner to receive a video signal, a video signal received by the reception tuner; an internal reception tuner that receives a video signal; a video control unit that controls so that the external tuner video reception unit receives a video signal of each channel; and a display control unit that controls to display a video signal received by the external tuner video reception unit in real time and the video signal received by the internal reception tuner at the same time on a screen.

The video signal received in real time by the external tuner video reception unit and the video signal received by the internal reception tuner may be displayed as objects used to select a channel on the screen.

The video control unit may transmit video reception control information for checking whether a video signal is receivable from the external device and, after receiving information that the video signal can be received from the external device, may control to receive the video signal of each channel.

The video control unit may receive power source information indicating whether power source is being supplied to the external device from the external device, and, when power source information indicating that the power source is not being supplied to the external device is received, the video control unit may control to supply the power source to the external device.

When transmission and reception rate to and from the external device is lowered, the video control unit may reduce the number of frames of the video signals to be received via the external tuner video reception unit.

According to another embodiment of the present invention, there is provided a video display system including: a video display device including an external tuner video reception unit that receives, from an external device having a reception tuner for receiving a video signal, a video signal received by the reception tuner, an internal reception tuner that receives the video signal, a video control unit that controls so that the external tuner video reception unit receives the video signal of each channel, and a display control unit that simultaneously displays the video signal received in real time by the external tuner video reception unit and the video signal received by the internal reception tuner on a screen; and the external device including a control unit that receives video information related to the video signal from the video control unit, and a video transmission unit that transmits the video signal to the external tuner video reception unit.

Upon receiving video information from the video control unit, the control unit may transmit a video signal of a channel different from the video signal of channel received by the internal reception tuner to an external tuner video reception unit via the video transmission unit.

The video display device may receive different video signals from plural external devices, respectively.

According to another embodiment of the present invention, there is provided a video display method including the steps of: receiving, from an external device having a reception tuner for receiving a video signal, a video signal of each channel received by the reception tuner; and simultaneously displaying the video signal received in real time in the receiving step and the video signal received by the internal reception tuner for receiving a video signal on a screen.

Further, in order to solve the issue, according to another aspect of the present invention, a program can be provided so that the functions of the video display device are realized by a computer. Furthermore, a recoding medium, which records the program and is readable by the computer, can be provided.

As described above, according to the present invention, since video signals are obtained from an external device via a tuner of the external device, a list of plural video signals can be simultaneously displayed in real time on a screen of a video display device. This allows a user to view a list of video signals and recognize details of program contents broadcasted in respective channels using a low-cost video display device which does not include plural tuners.

DETAILED DESCRIPTION OF THE INVENTION

Figure 1:
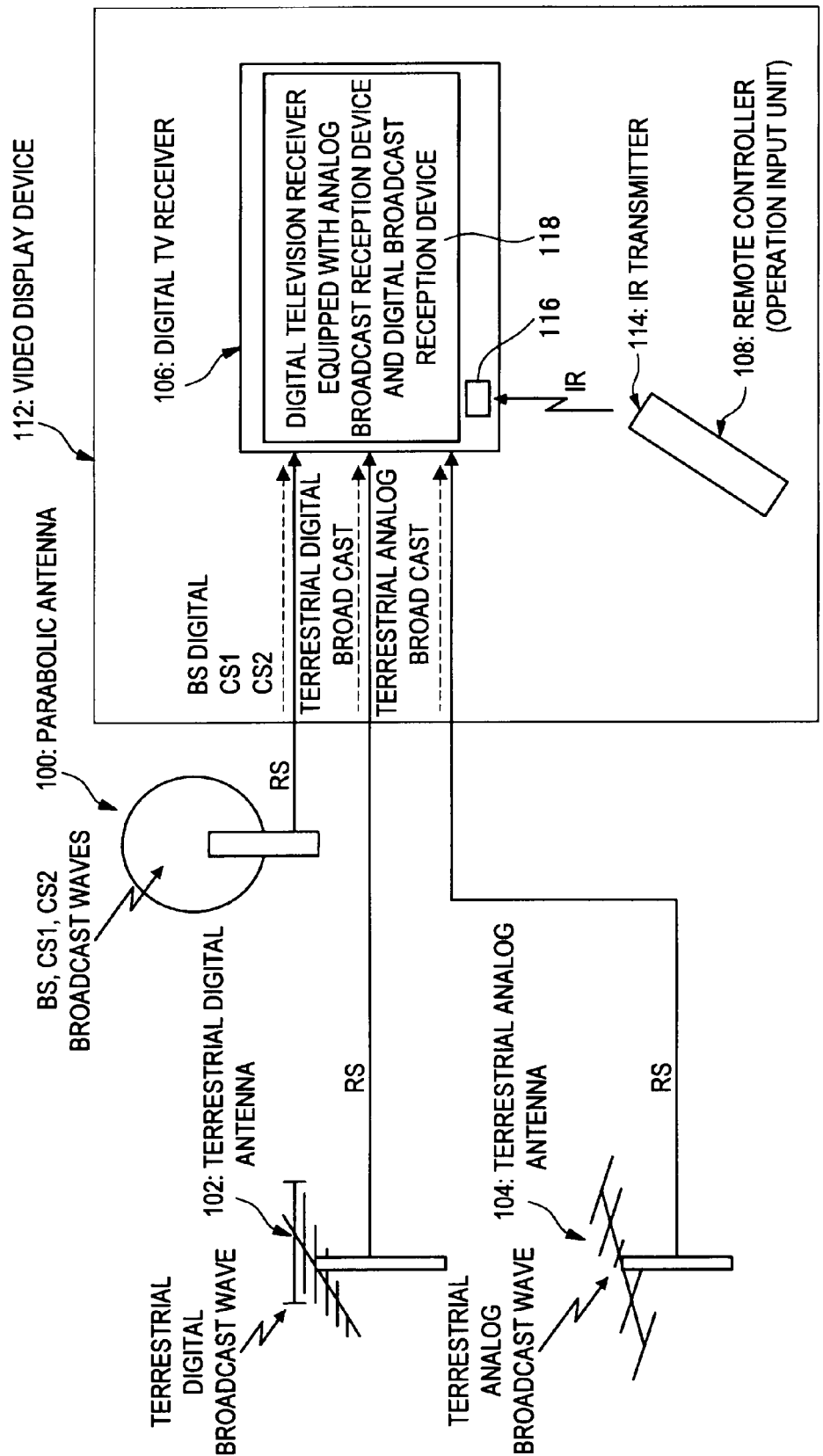
FIG. 1 is an explanatory diagram showing an example of a configuration of an electronic device system in which a technology according to an embodiment of the present invention can be applied.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Explanation Flow]

Firstly, referring to FIG. 1, an example of a system configuration of an electronic device system to which a technology according to an embodiment of the present invention is applicable will be described. Referring to FIG. 2, an example of a key structure of a remote controller included in the electronic device system will be described. Then, referring to FIG. 3, an example of a hardware configuration capable of realizing a function of a digital television receiver according to the embodiment will be described.

Figure 4:
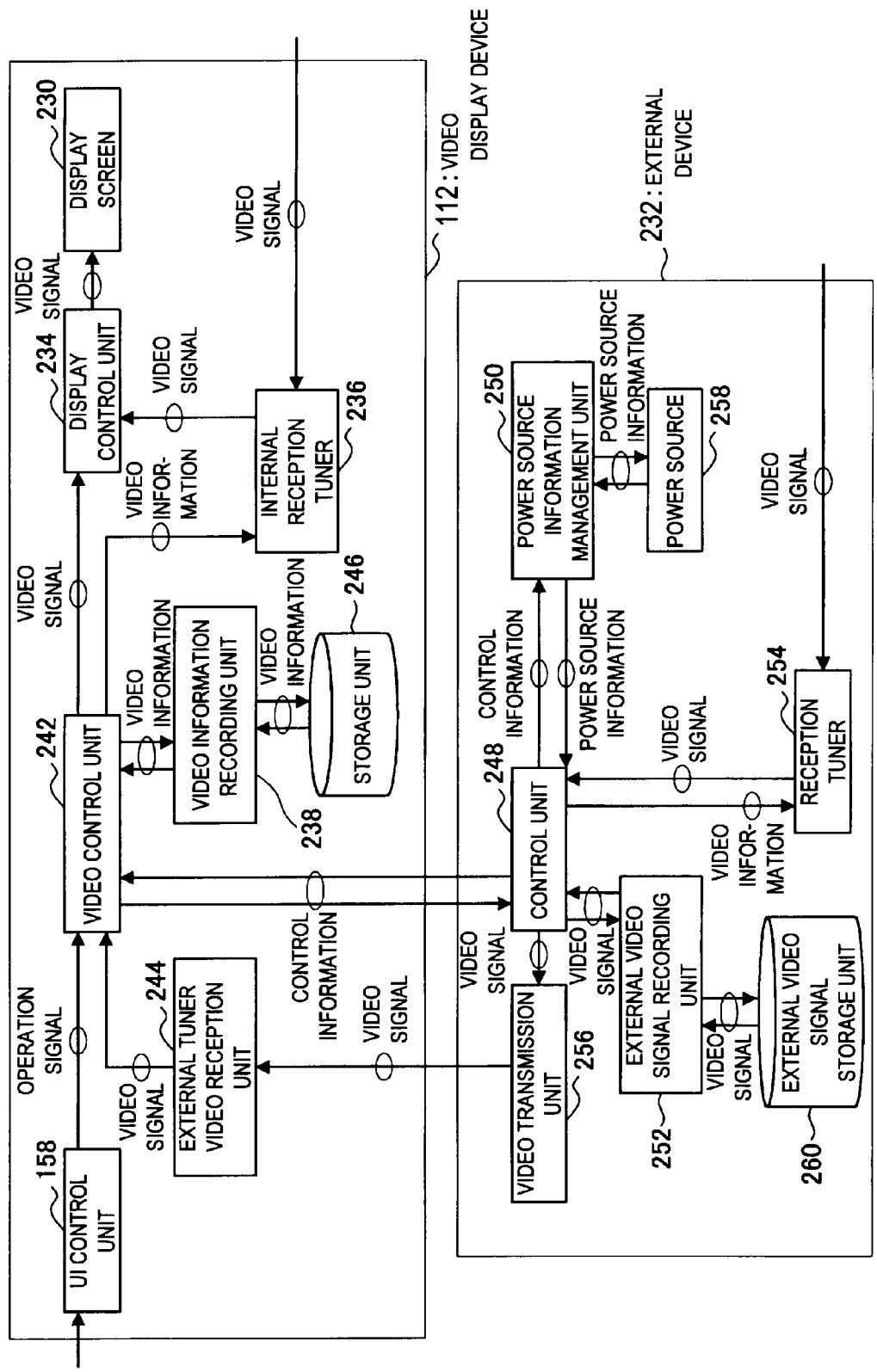
FIG. 4 is an explanatory diagram showing a functional configuration of the video display device according to the embodiment.
Figure 5:
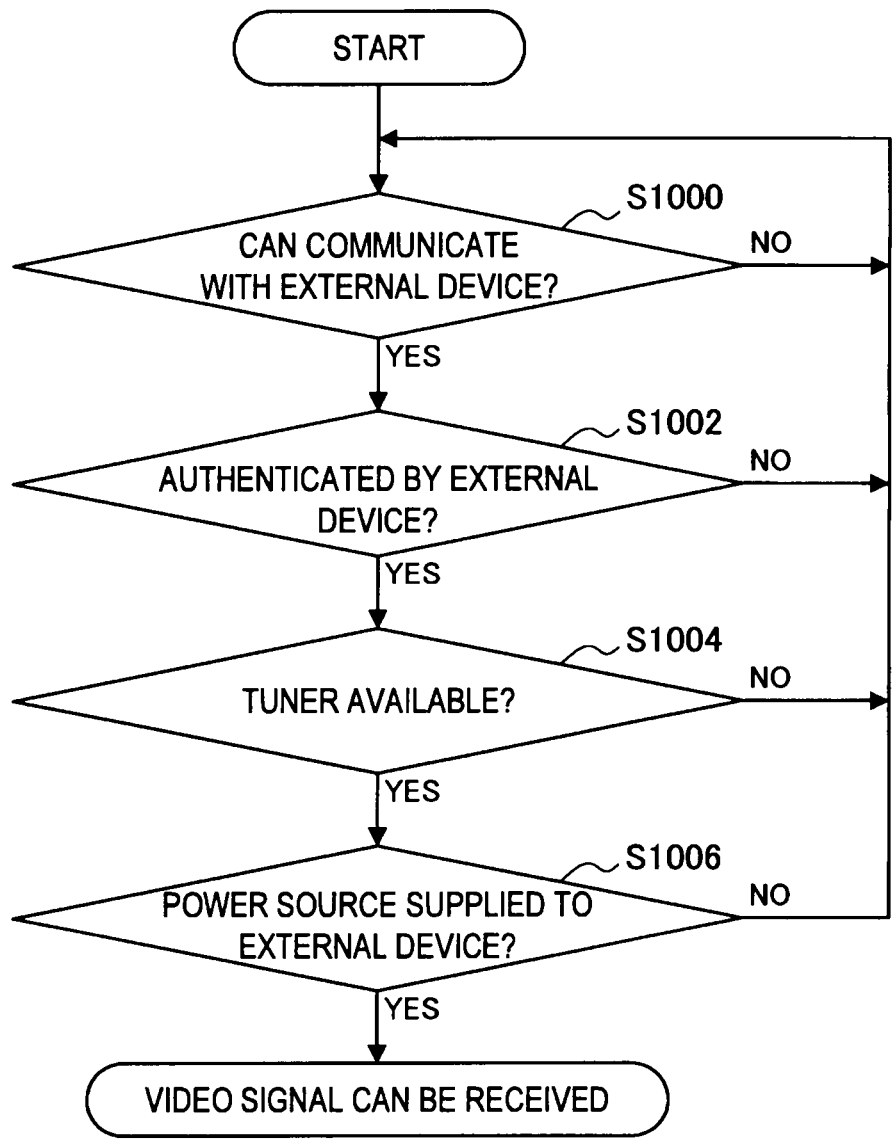
FIG. 5 is an explanatory diagram showing a flow of how plural videos are displayed in real time on the video display device according to the embodiment.
Figure 6:
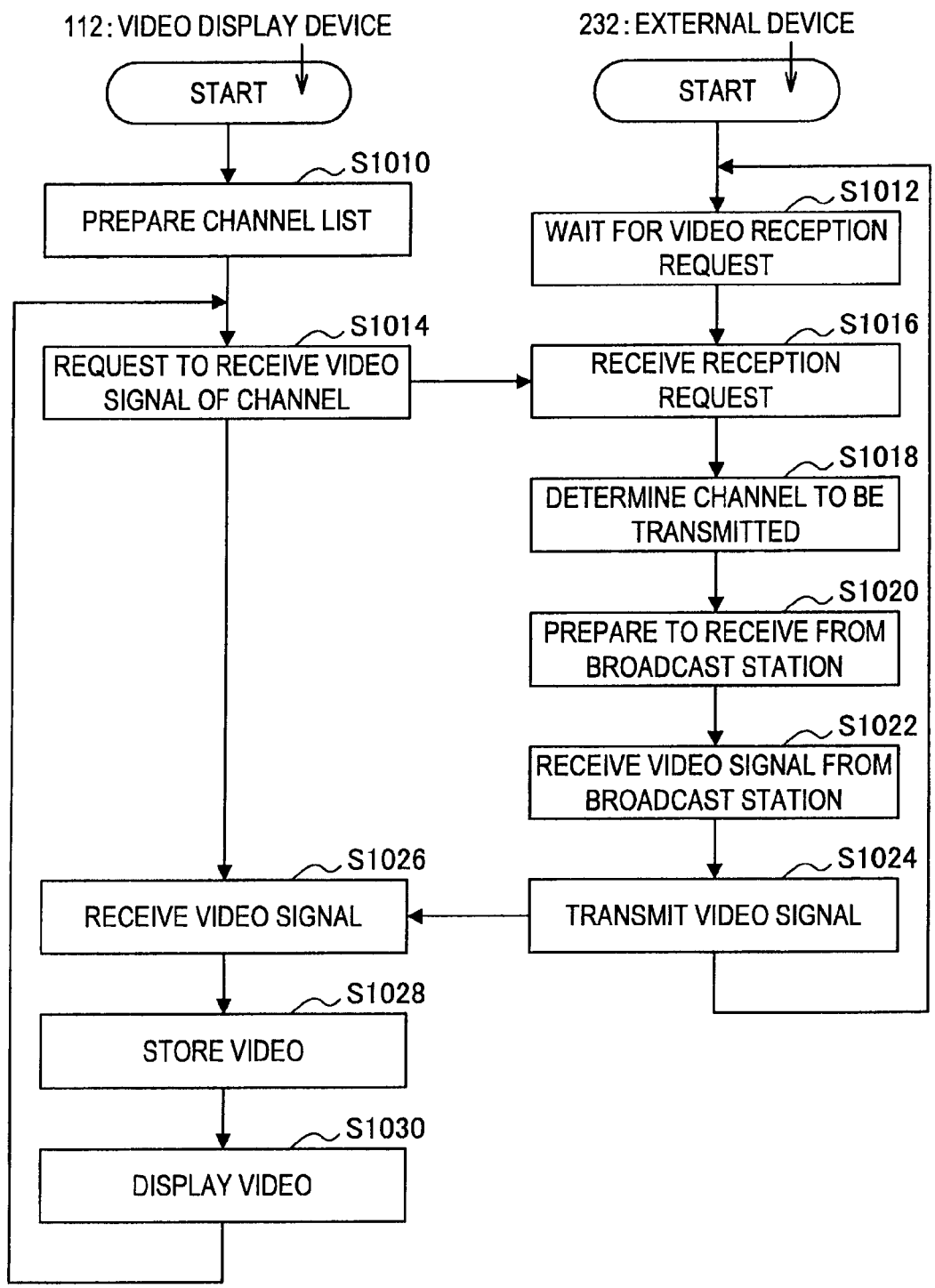
FIG. 6 is an explanatory diagram showing a flow of how plural videos are displayed in real time on the video display device according to the embodiment.

Referring to FIG. 4, a functional configuration of a video display device according to an embodiment of the present invention will be described. Referring to FIGS. 5 and 6, functional configurations of the video display device according to an embodiment of the present invention will be described. Then, referring to FIGS. 7 to 12, application examples of a video display method according to an embodiment of the present invention will be described. In the end, technical idea of the embodiments will be summarized and, operation and effect obtained from the technical idea will briefly be described.

1. Example of system configuration of electronic device system
2. Example of key structure of remote controller
3. Example of hardware configuration of video display device
4. Functional configuration of video display device
5. Process flow of video display method
6. Application examples of video display method
7. Conclusion

1. CONFIGURATION OF ELECTRONIC DEVICE SYSTEM

Firstly, referring to FIG. 1, a system configuration of an electronic device system 110 according to an embodiment of the present invention will be described. FIG. 1 is an explanatory diagram showing an example of a system configuration of the electronic device system 110 according to the embodiment.

Figure 2:
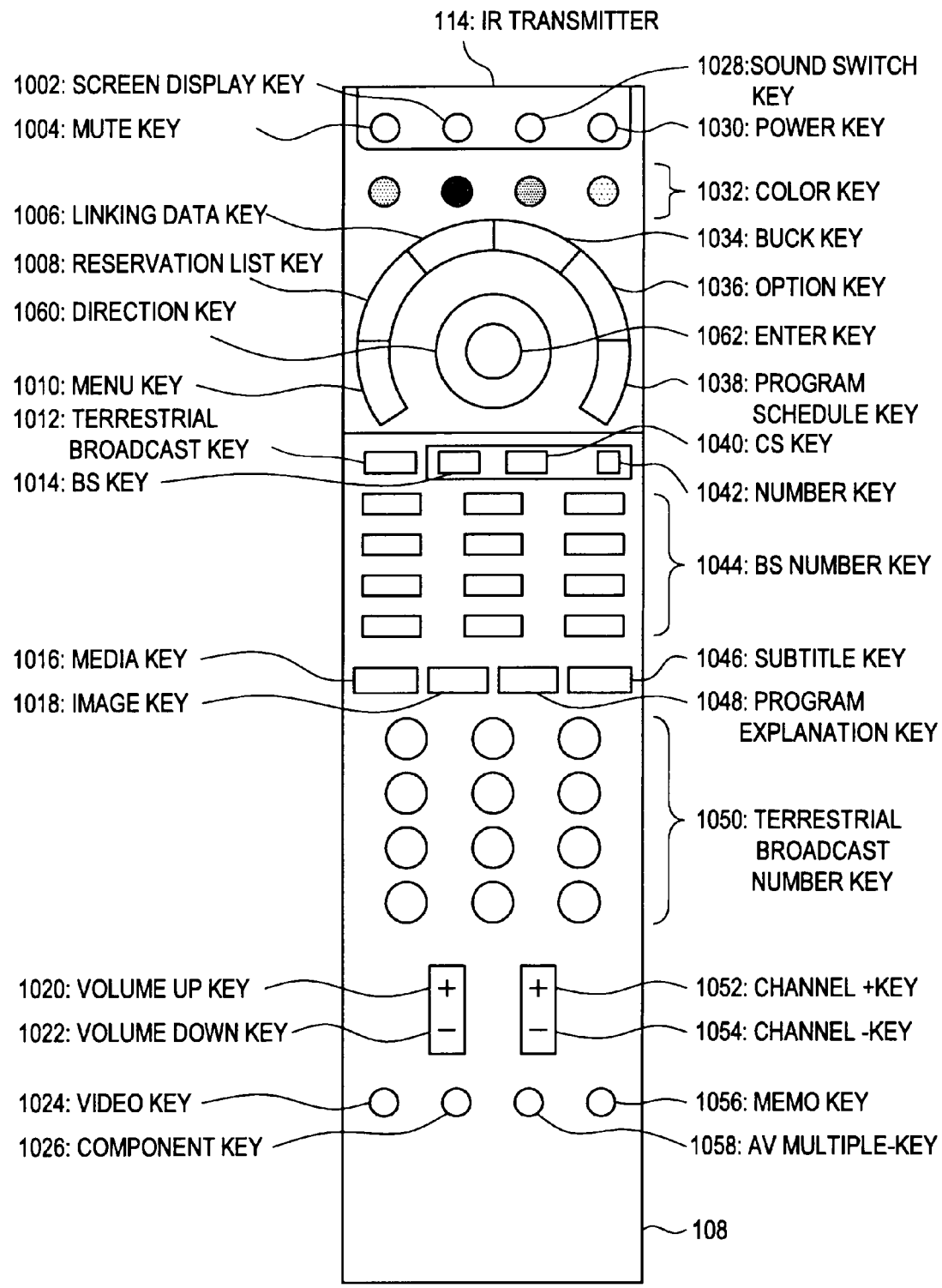
FIG. 2 is an explanatory diagram showing an example of a remote controller that is a part of the electronic device system to which the technology of the embodiment can be applied.

As shown in FIG. 1, the electronic device system 110 mainly includes a parabolic antenna 100, a terrestrial digital antenna 102, a terrestrial analog antenna 104 and a digital television receiver 106.

The digital television receiver 106 shown in FIG. 1 is equipped with an analog broadcast receiving function and a digital broadcast receiving function. The digital television receiver 106 also has an automatic channel setting function for terrestrial digital broadcasts and a message display function. The digital television receiver 106 further has a remote controller 108 serving as an operation means. Further, the digital television receiver 106 has an infrared receiving unit 116 for receiving infrared signals IR transmitted from the remote controller 108. Note that the digital television receiver 106 and remote controller 108 may collectively be referred to as a video display device 112.

The electronic device system 110 includes a terrestrial broadcast system and a digital satellite broadcast system. For example, reception signals RS received by the parabolic antenna 100 are input to the digital television receiver 106. Reception signals RS received by the terrestrial digital antenna 102 and reception signals RS received by the terrestrial analog antenna 104 are also input to the digital television receiver 106. In this manner, signals of various broadcasts such as terrestrial analog broadcast, terrestrial digital broadcast and satellite broadcast are input to the digital television receiver 106. Further, the digital television receiver 106 may be provided with an input terminal to be connected to a player, a video recorder and the like.

On the other hand, the remote controller 108 has an IR transmitter 114 (remote controller signal transmitter 1000) for transmitting infrared (IR) signals. The remote controller 108 outputs an infrared signal in response to a user's operation and provides various instructions to the digital television receiver 106, for example. In other words, the remote controller 108 serves as a user operation input means and a control means of the digital television receiver 106. Note that the many of user's operations are executed using operation keys provided to the remote controller 108.

2. KEY STRUCTURE OF REMOTE CONTROLLER

Referring to FIG. 2, a key structure of the remote controller 108 will be described. FIG. 2 is an explanatory diagram showing an example of the key structure of the remote controller 108. Note that FIG. 2 only shows main keys used to input operations according to the embodiment.

As shown in FIG. 2, the remote controller 108 has a screen display key 1002, a mute key 1004, a linking data key 1006, a reservation list key 1008 and a menu key 1010. The remote controller 108 also has a terrestrial broadcast key 1012, a BS key 1014, a media key 1016, a image key 1018, a volume up key 1020, a volume down key 1022, a video key 1024 and a component key 1026.

The remote controller 108 also has a sound switch key 1028, a power key 1030, a color key 1032, a back key 1034, an option key 1036, a program schedule key 1038, a CS key 1040, a number key 1042 and a BS number key 1044. The remote controller 108 further has a subtitle key 1046, a program explanation key 1048, a terrestrial broadcast ten-key 1050, a channel + key 1052 and a channel – key 1054. The remote controller 108 further has a memo key 1056, an AV multiple key 1058, a direction key 1060 and an enter key 1062.

The screen display key 1002 is for switching input systems of video signals input from plural input terminals provided to the digital television receiver 106. The mute key 1004 is operated to switch on and off of a mute function for the sound output from a speaker provided to the digital television receiver 106. The power key 1030 is operated to turn on and off the power of the digital television receiver 106. The sound switch key 1028 is operated to switch sound types (main audio and sub audio, for example) of the sound output from the speaker provided to the digital television receiver 106.

The color key 1032 is operated to execute various selections following a guide screen displayed on the digital television receiver 106.

The menu key 1010 is operated to use various menus such as a shortcut menu displayed on the digital television receiver 106. The linking data key 1006 is operated to switch on and off of a graphic display such as an OSD (on screen display), which is superimposed on video signals. The reservation list key 1008 is operated to switch to a screen of a list of BS digital broadcast, CS digital broadcast and terrestrial digital broadcast, which are recorded using a digital tuner provided to the digital television receiver 106. The back key 1034 is for switching to a program channel, which was previously displayed before the currently displayed program channel, from the current program channel, on a screen 118 of the digital television receiver 106. The option key 1036 is operated to display various option menus such as brightness and contrast of video signals. The program schedule key 1038 is operated to switch on and off of a display of a program schedule based on EPG information.

The circular-shaped direction key 1060 is for moving a cursor from right to left or up and down on the screen 118 of the digital television receiver 106. The direction key 1060 is also operated to move the cursor from right to left or up and down on the screen 118 when listed videos are displayed, which will be described below. The enter key 1062 is operated to determine a selected item on the screen 118 of the digital television receiver 106. For example, when listed videos, which will be described below, are displayed and the cursor is placed on a desired video, the enter key 1062 is operated to determine to view the video.

The terrestrial broadcast key 1012 is operated to display terrestrial analog broadcast or terrestrial digital broadcast on the digital television receiver 106. The BS key 1014 is operated to switch the screen to BS digital broadcast on the digital television receiver 106. The CS key 1040 is operated to switch the screen to CS digital broadcast on the digital television receiver 106. The number key 1042 is for inputting a channel number in the tens place regarding broadcast channels displayed on the digital television receiver 106. The BS number key 1044 is operated to select a channel while BS digital broadcast or CS digital broadcast displayed on the digital television receiver 106 is being viewed.

The media key 1016 is operated to switch terrestrial analog broadcast, terrestrial digital broadcast, BS digital broadcast and CS digital broadcast in order, which are displayed on the digital television receiver 106. The image key 1018 is operated to switch videos while a program, in which two or more videos are simultaneously distributed, is being viewed on the digital television receiver 106. The subtitle key 1046 is operated to switch on an off of a subtitle display displayed on the screen 118 of the digital television receiver 106. The program explanation key 1048 is operated to switch on and off of a program explanation display displayed on the screen 118 of the digital television receiver 106.

The terrestrial broadcast ten-key 1050 is operated to switch channels while a user is viewing terrestrial analog broadcast or terrestrial digital broadcast using the digital television receiver 106.

The volume up key 1020 is operated to turn up the sound output from the speaker provided to the digital television receiver 106. The volume down key 1022 is operated to turn down the sound output from the speaker provided to the digital television receiver 106. The channel + key 1052 is operated to switch the program channels, which are viewed by the user, in ascending order on the digital television receiver 106. The channel + key 1054 is operated to switch the program channels, which are viewed by the user, in descending order on the digital television receiver 106.

The video key 1024, component key 1026 and AV multiple key 179 are operated to display videos input from video devices connected to various types of external terminals provided to the digital television receiver 106. The memo key 1056 is operated to freeze a frame of video signal, which is being displayed on the digital television receiver 106, and display as a still video.

As described above, the remote controller 108 includes operation keys to execute various operations. When the user presses the operation key, an infrared signal IR corresponding to the operation key is transmitted from the IR transmitter 108A. The infrared signal IR transmitted from the remote controller 108 is received by the infrared receiving unit 114 provided to the digital television receiver 106. In accordance with the infrared signal IR received from the remote controller 108, the digital television receiver 106 switches video signals displayed on the screen 118, for example. In this manner, when the user operates the remote controller 108, the digital television receiver 106 is controlled via the infrared signal IR.

3. HARDWARE CONFIGURATION OF VIDEO DISPLAY DEVICE

Figure 3:
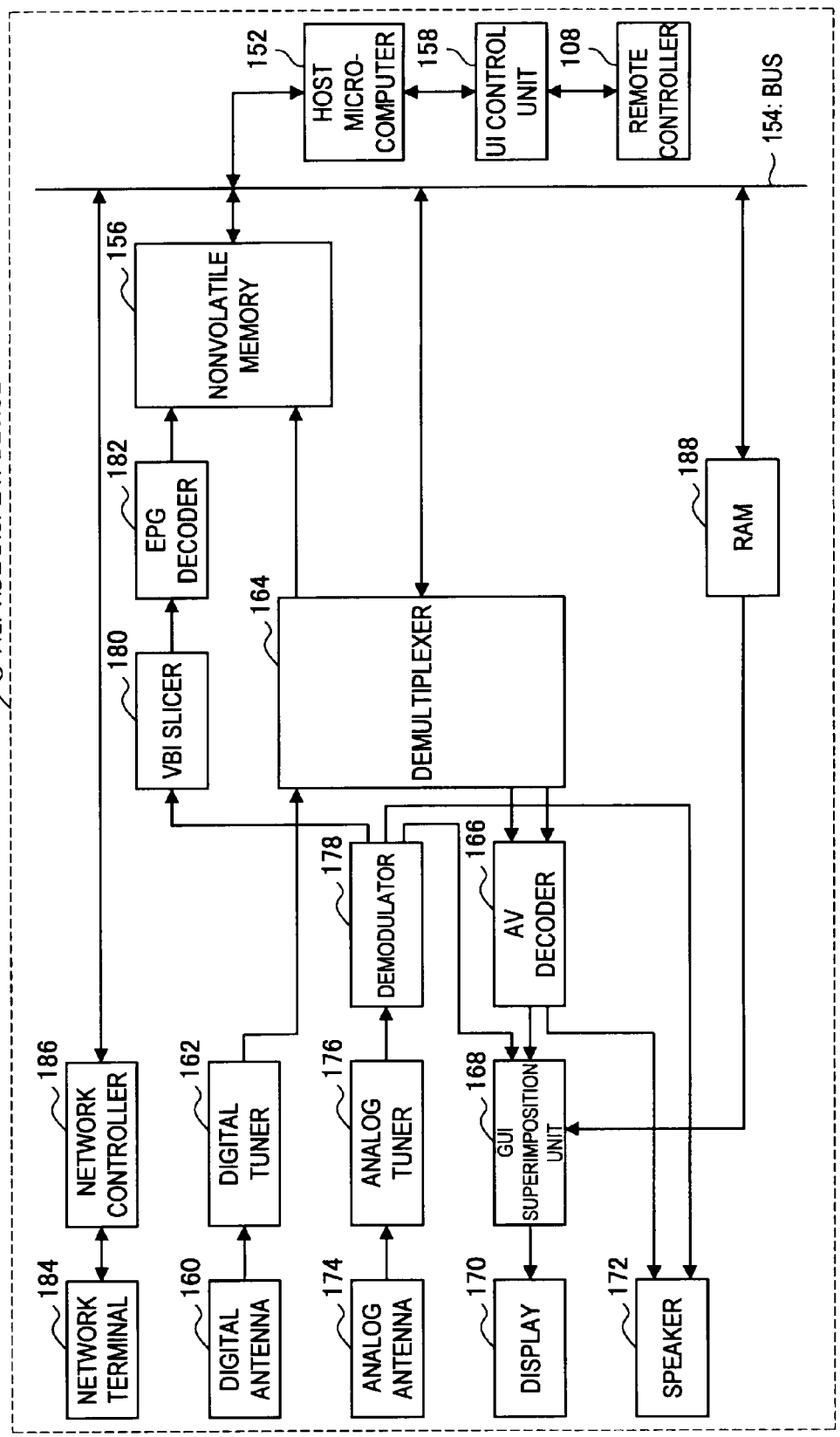
FIG. 3 is an explanatory diagram showing an example of a hardware configuration of a video display device according to the embodiment.

Functions included in the video display device 112 can be realized by the video display device 112 having a hardware configuration shown in FIG. 3, for example. FIG. 3 is an explanatory diagram showing a hardware configuration of the video display device 112.

As shown in FIG. 3, the video display device 112 mainly includes a host microcomputer 152, a bus 154, a nonvolatile memory 156 and a UI (user interface) control unit 158. The video display device 112 further includes a digital antenna 160, a digital tuner 162, a demultiplexer 164, an AV decoder 166, a GUI superimposition unit 168, a display 170 and a speaker 172.

Further, the video display device 112 includes an analog antenna 174, an analog tuner 176, a demodulator 178, a VBI slicer 180 and an EPG decoder 182. Furthermore, the video display device 112 includes a network terminal 184, a network controller 186 and a RAM (Random Access Memory) 188.

The video display device 112 has digital and analog television broadcast receiving and reproducing functions and an EPG information acquisition function. The host microcomputer 152 executes various processes according to a program recorded in an embedded memory (not shown) or the non-volatile memory 156 connected via the bus 154. Further, the video display device 112 receives an operation signal, as a command, input from the remote controller (hereinafter, also referred to as controller) 108 via the UI control unit 158. Operations in the respective components are controlled according to the command.

(Reception of Digital Broadcast Signals)

The video display device 112 inputs digital broadcast signals received via the digital antenna 160 to the digital tuner 162, under the control of the host microcomputer 152. The digital tuner 162 extracts a broadcast signal of a predetermined channel from the digital broadcast signals under the control of the host microcomputer 152. The predetermined channel is, for example, a channel specified by a user's operation. Further, the video display device 112 performs a demodulation process, a descramble process and the like on the extracted broadcast channel signal. By the demodulation process and descramble process, broadcast channel data is acquired. The broadcast channel data is input to the demultiplexer 164.

The demultiplexer 164 separates video data and audio data from the broadcast channel data and sends the data to the AV decoder 166. The AV decoder 166 decodes the video data to generate a video signal and decodes audio data to generate an audio signal. The video signal generated by the AV decoder 166 is sent to the display 170 via the GUI (graphical user interface) superimposition unit 168. On the other hand, the audio signal generated by the AV decoder 166 is sent to the speaker 172. Here, the GUI superimposition unit 168 superimposes graphic signal such as an OSD (on screen display) on the video signal.

When the video signal is sent to the display 170 in this manner, a program video of the digital broadcast is output on the display 170. On the other hand, a program audio is output from the speaker 172. As described above, when a digital broadcast is received, a television broadcast reception device 150 reproduces a program video signal and a program audio signal based on the received signal and outputs to the display 170 and the speaker 172.

(Reception of Analog Broadcast Signals)

Further, the video display device 112 inputs analog broadcast signals received via the analog antenna 174 to the analog tuner 176 under the control of the host microcomputer 152. The analog tuner 176 extracts a broadcast signal of a predetermined channel from the analog broadcast signal under the control of the host microcomputer 152. The predetermined channel is, for example, a channel specified by the user's operation. The analog tuner 176 sends the extracted broadcast signal to the demodulator 178. The demodulator 178 performs a predetermined demodulation process on the broadcast signal to obtain a demodulated signal. Further, the demodulator 178 separates a video signal and an audio signal from the demodulated signal. The video signal separated by the demodulator 178 is sent to the display 170 via the GUI superimposition unit 168. On the other hand, the audio signal separated by the demodulator 178 is sent to the speaker 172. Here, the GUI superimposition unit 168 superimposes graphic signal such as an OSD on the video signal.

When the video signals are sent to the display 170 in this manner, program video of the analog broadcast is output on the display 170. On the other hand, program audio is output from the speaker 172. As described above, when an analog broadcast is received, the television broadcast reception device 150 reproduces a program video signal and a program audio signal from received signals and outputs to the display 170 and the speaker 172.

(Extracting Process and Recording Process of EPG Information: for Digital Broadcast)

Further, in the television broadcast reception device 150, the demultiplexer 164 separates EPG information of digital broadcast from the broadcast channel data and records the information to the nonvolatile memory 156 under the control of the host microcomputer 152. When the EPG information is provided for each channel, the host microcomputer 152 obtains EPG information from the respective broadcast channel data of the plural receivable channels and records the information to the nonvolatile memory 156.

(Extracting Process and Recording Process of EPG Information: for Analog Broadcast)

Further, in the television broadcast reception device 150, the demodulated signal demodulated by the demodulator 178 is sent to the VBI (vertical blanking interval) slicer 180 under the control of the host microcomputer 152. The VBI slicer 180 slices a particular line of the demodulated signal and sends it to the EPG decoder 182. The EPG decoder 182 decodes the particular line of the demodulated signal to acquire EPG information of the analog broadcast and records the information to the nonvolatile memory 156.

Further, the television broadcast reception device 150 receives EPG information of the analog broadcast transmitted from an EPG information distribution server (not shown) under the control of the host microcomputer 152. The received EPG information is recorded to the nonvolatile memory 156 via the network controller 186 and the bus 154.

In this manner, the television broadcast reception device 150 acquires EPG information. Here, the EPG information includes program information related to programs, which are scheduled to be broadcasted. The program information includes, for example, a name of broadcast station, channel number, broadcast date and time, broadcast start time, broadcast end time, title, category, program summary, program detail and cast.

4. FUNCTIONAL CONFIGURATION OF VIDEO DISPLAY DEVICE

Next, referring to FIG. 4, a functional configuration of the video display device 112 according to the present embodiment will be described. FIG. 4 is an explanatory diagram showing an example of a functional configuration of the video display device 112 according to the present embodiment. The video display device 112 is characterized by being equipped with a function for acquiring a video signal of the external device in real time and simultaneously displaying a video signal related to the video signal and a video signal internally provided.

As shown in FIG. 4, the video display device 112 mainly includes an external tuner video reception unit 244, an internal reception tuner 236, a video control unit 242, a display control unit 234, a video information recording unit 238, a storage unit 246, a display screen 230 and a UI control unit 158.

In addition, as shown in FIG. 4, the external device 232 mainly includes a control unit 248, a video transmission unit 256, a reception tuner 254, a power source information management unit 250, a power source 258, an external video signal recording unit 252 and an external video signal storage unit 260.

(Video Signal Received by Internal Reception Tuner)

The UI control unit 158 receives an operation signal input by the user using the controller 108. The UI control unit 158 transmits the operation signal to the video control unit 242. The operation signal includes, for example, a signal indicating which broadcast the user desires to view among terrestrial analog broadcast, terrestrial digital broadcast, BS digital broadcast and CS digital broadcast or a signal related to a channel number, which the user desires to view. As a concrete operation, for example, the user presses the power key 1030 of the controller 108. Then, the user presses one of the terrestrial broadcast key 1012, BS key 1014 and CS key 1040 of the controller 108. Then, the user presses a desired channel number by using the BS ten-key 1044 or terrestrial broadcast ten-key 1050. By these operations, for example, the user can transmit operation signals to the UI control unit 158.

The video control unit 242 transmits video information related to the video signal of the channel to be acquired to the internal reception tuner 236 (hereinafter, referred to as internal video information) based on the operation signal received by the UI control unit 158. The video information described here includes a channel number of the video signal. Note that the channel to be acquired may be a broadcast and a channel desired by the user. Next, the internal reception tuner 236 receives a video signal from the broadcast station based on the video information. Then, the internal reception tuner 236 transmits the received video signal (hereinafter, referred to as internal video signal) to the display control unit 234. When the internal video signal is transmitted to the display screen 230, the video signal is displayed on the display screen 230. The user executes various operations such as changing channels while watching the internal video signal displayed on the display screen 230.

The various operations may include, for example, changing sound volume, adjusting brightness and changing coloring, in addition to changing channels. These operations are executed using the remote controller 108 shown in FIG. 2, for example. The various operations further include operations for adjusting the arrangement of plural video signals displayed on the screen or changing sizes of videos as described below. The plural video signals can be displayed as icons. When the plural video signals are displayed in real time on the single screen of the video display device 112, this allows the user to easily select the program to view.

Further, when displaying the plural video signal in real time is realized without using plural tuners, this keeps the manufacturing cost low. In this point of view, the present embodiment proposes a technology related to a video display device capable of receiving video signals received by a reception tuner of an external device and simultaneously displaying plural video signals in real time. Hereinafter, the technology will be described in detail.
(Checking Whether Video Signals are Receivable from External Device)

Firstly, the video control unit 242 transmits video reception control information to the control unit 248 of the external device 232. Here, the video reception control information includes information to be transmitted to check whether video display device 112 can receive video signals from the external device 232. When video signals can be transmitted from the external device 232 to the video display device 112, the control unit 248 transmits, to inform the video display device 112, information indicating that the video signal can be transmitted. In this case, the video display device 112 can receive video signals from the external device 232, as described below.

On the other hand, when video may not be transmitted to the video control unit 242, the control unit 248 transmits information to inform that the video signals may not be transmitted. The case where the video signals may not be transmitted is, for example, a case where the video signals may not be received because the reception tuner 254 of the external device 232 is under fault conditions.

Further, when the video control unit 242 transmits video reception control information to the external device 232, the video reception control information may include an authentication signal to receive a video signal from the external device 232. The authentication signal is a signal that the video display device 112 is required to send to receive video signals from the external device 232. For example, the user operates the controller 108 and transmits an authentication signal to the UI control unit 158. The UI control unit 158 transmits the authentication signal to the video control unit 242, and then, the video control unit 242 transmits the authentication signal to the control unit 248. In this case, the authentication signal may be an authentication number dedicated to the external device, which is input by the user using the controller 108. Further, as another example, the authentication numbers dedicated to the external device may be recorded in the storage unit 246 as authentication signals. In this case, the video information recording unit 238 receives the authentication signal and transmits the signal to the video control unit 242.

Then, the video control unit 242 can transmit the authentication signal to the control unit 248. The control unit 248 receives the authentication signal and transmits, to the video control unit 242, information indicating that the video signal may not be transmitted when it is determined that the video signal may not be transmitted to the video display device 112. The case where it is determined that video signals may not be transmitted to the video display device 112 is, for example, a case where the authentication number transmitted from the video control unit 242 to the control unit 248 as an authentication signal does not correspond with the authentication number dedicated to the external device. Further, as another example, the reception tuner 254 of the external device 232 may already be in use. Such an already in-use condition is, for example, a case where the reception tuner 254 is being used for another propose before the external device 232 transmits video signals to the video display device 112, which is an object of the present embodiment.

Then, when the control unit 248 can transmit the video signals to the video control unit 242, the video control unit 242 transmits power source control information to the control unit 248. The power source control information described here is information that is transmitted from the video control unit 242 to the control unit 248 so that the control unit 248 transmits, to the video control unit 242, information indicating whether the power source 258 of the external device 232 is being supplied. Upon acquiring the power source control information, the control unit 248 transmits power source control information to the power source information management unit 250 of the external device 232. Upon acquiring the power source control information, the power source information management unit 250 transmits, to the control unit 248, information indicating that the power source 258 is being supplied when the power source 258 is being supplied. Then, the control unit 248 transmits, to the video control unit 242, the information indicating that the power source 258 is being supplied.
(Displaying Video Signals Received from External Device)

Upon receiving the information that the power source 258 is being supplied, the video control unit 242 transmits internal video information to the control unit 248. The internal video information is internal video information that is transmitted from the video control unit 242 to the internal reception tuner 236 under the control of the UI control unit 158. When the video control unit 242 transmits the internal video information to the control unit 248, this allows the control unit 248 to transmit, for example, video signals different from the internal video signals related to the internal video information to the video display device 112. The different video signals include a video signal of a different channel. Then, from the external device 232 having the control unit 248, a video signal of a channel different from the internal video signal related to the internal video signals, which is being displayed by the video display device 112, is transmitted to the video display device 112. With this configuration, the video display device 112 can display plural different video signals at the same time.

Then, the control unit 248 transmits video information (hereinafter, referred to as external video information) to the reception tuner 254 based on the internal video information received from the video control unit 242. The external video information described here is video information related to the video signal to be acquired by the reception tuner 254 (hereinafter, referred to as external video signal) and includes a channel number and the like.

The external video signal may be transmitted from the control unit 248 to the external video signal recording unit 252. The external video signal recording unit 252 can record the external video signal to the external video signal storage unit 260. For example, the control unit 248 may receive external video signals recorded in the storage unit and transmit external video information based on the external video signals to the reception tuner 254.

Then, the reception tuner 254 receives the external video signals from the broadcast station. The control unit 248 receives the external video signals from the reception tuner 254. The control unit 248 then transmits the external video signal to the video transmission unit 256. The video transmission unit 256 transmits the external video signal to the external tuner video reception unit 244. Upon receiving the external video signal, the external tuner video reception unit 244 transmits the external video signal to the video control unit 242. The video control unit 242 transmits the external video signal to the display control unit 234. When the external video signal is transmitted to the display screen 230, the video signals is displayed on the display screen 230. The user executes various operations such as changing channels while watching the external video signal displayed on the display screen 230. The display screen 230 can simultaneously display the internal video signal and the external video signal in real time.

The various operations include, for example, changing sound volume, adjusting brightness and changing coloring in addition to changing channels. These operations are executed by using the remote controller 108 shown in FIG. 2, for example. The various operations further include operations for adjusting an arrangement of plural video signals displayed on the screen or changing sizes of the videos. The internal video signal and the external video signal may be displayed as icons.

Further, the external tuner video reception unit 244 may receive, from plural external devices 232, video signals received by reception tuners 254 included in the external devices 232. The video control unit 242 receives plural external video signals from the external tuner video reception unit 244. The video control unit 242 transmits the received plural external video signals to the display control unit 234. When the external video signals are transmitted to the display screen 230, plural external videos and internal video are simultaneously displayed on the display screen 230 in real time. The user can execute various operations such as changing channels while watching the plural videos displayed on the display screen 230.

When the plural video signals are displayed on the display screen 230 in this manner, it is preferable that the plural video signals are different video signals. Here, the different videos include videos of different channels. Since videos of different channels are simultaneously displayed in real time, this helps the user to easily select a program to view. Further, when displaying plural video signals simultaneously in real time is realized without using plural tuners, this keeps the manufacturing cost low and users can purchase video display devices in low cost.

Further, when the video display device 112 displays the plural video signals, the video control unit 242 may create a channel list. For example, when the plural video signals are displayed as icons on the display screen 230, the plural video signals can be displayed on the display screen 230 based on the channel list created by the video control unit 242. The icons described here are examples of objects used to select channels. The channel list represents, for example, channel information related to plural video signals that the video display device 112 can display. The channel information includes numbers, program schedule and frequency bands of the respective channels, for example.

The channel list is recorded in the storage unit 246, for example. The channel list may be previously recorded as a database in the storage unit 246. For example, the channel list may be a list transmitted from a broadcast station and stored in the storage unit 246. Further, when the user operates the controller 108, a channel list is created and recorded in the storage unit 246. In this case, the video control unit 242 acquires the channels list from the storage unit 246.

Further, when the video display device 112 receives an external video signal from the external device 232, reception rate can be slower than a normal rate. Here, the normal rate represents a rate that the video display device 112 receives an external video signal from the external device 232 and displays the whole frames of the external video signal in real time. In such a case, the video display device 112 may not display the whole frame of the external video signal received from the external device 232 in real time. Here, as the communication rate between the video display device 112 and the external device 232 becomes slower, the video control unit 242 can reduce the number of frames of video signals received via the external tuner video reception unit 244. Thus, even when the rate of a reception from the external device 232 is slower than the normal rate, the video display device 112 can reduce the number of the frames to be received and display video signals in real time.

(Case where Power Source is not being Supplied to External Device)

On the other hand, when power source 258 is not being supplied to the external device 232, the power source information management unit 250, which has received the power source control information, transmits information, which indicates that the power source 258 is not being supplied, to the control unit 248. The control unit 248 transmits, to the video control unit 242, the information that the power source 258 is not being supplied. Then, the video control unit 242 transmits, to the control unit 248, information for supplying the power source. Then, the control unit 248 transmits, to the power source information management unit 250, the information for supplying the power source. The power source information management unit 250, which received the information for supplying the power source, operates to supply the power source 258. When the power source 258 is supplied, the power source information management unit 250 transmits, to the control unit 248, information that the power source 258 is being supplied. Then, as described above, the control unit 248 transmits, to the video control unit 242, the information that the power source 258 is being supplied. Then, the video control unit 242 transmits internal video information to the control unit 248. After this process, the process flow in which the control unit 248 receives the external video signal received by the reception tuner 254 of the external device 232 and the display control unit 234 controls the display screen 230 to display the external video is the same as the above described processes.

5. PROCESS FLOW OF VIDEO DISPLAY METHOD

Next, referring to the flows of FIGS. 5 and 6, a method for simultaneously displaying plural videos in real time will be described.
(Checking whether Video Signal is Receivable from External Device)

FIG. 5 shows a flow of a method that the video display device 112 checks whether a video signal is receivable from the external device 232.

Firstly, as shown in step S1000, the video display device 112 checks whether the external device 232 is able to transmit or receive information. The video control unit 242 of the video display device 112 transmits video reception control information to the control unit 248 of the external device 232. Here, the video reception control information is information to be transmitted to check whether video display device 112 can receive a video signal from the external device 232. When external device 232 can transmit a video to the video display device 112, the control unit 248 transmits information indicating that the video signal is transmittable to the video display device 112. In this case, the video display device 112 can receive the video signal from the external device 232 as described below.

On the other hand, when a video may not be transmitted to the video control unit 242, the control unit 248 transmits information indicating that the video signal is not transmittable. The case where the video signal may not be transmitted is, for example, a case where the video signal is not receivable since the reception tuner 254 of the external device 232 is under fault conditions.

Then, as shown in step S1002, when video display device 112 can transmit and receive information to and from the external device 232, the video display device 112 checks whether the video display device 112 is authorized by the external device 232 to receive the video signal. To check whether the video display device 112 is authorized or not, for example, an authentication signal for receiving video signals from the external device 232 can be included when the video control unit 242 transmits video reception control information to the external device 232. The authentication signal is a signal that the video display device 112 is required to send to receive video signals from the external device 232. For example, the user transmits the authentication signal to the UI control unit 158 via the controller 108. Then, the UI control unit 158 transmits the authentication signal to the video control unit 242 so that the video control unit 242 can transmit the authentication signal to the control unit 248. In this case, the authentication signal may be an authentication number dedicated to the external device, which is input by the user using the controller 108.

Further, as another example, authentication number dedicated to the external device can be recorded to the storage unit 246 as an authentication signal. In this case, the video information recording unit 238 receives the authentication signal and transmits the signal to the video control unit 242. Then, the video control unit 242 can transmit the authentication signal to the control unit 248. When the control unit 248 receives the authentication signal and recognizes that the video signal may not be transmitted to the video display device 112, the control unit 248 transmits, to the video control unit 242, information indicating that the above video signals may not be transmitted. Further, when the control unit 248 receives the authentication signal and recognizes that the video signal can be transmitted to the video display device 112, the control unit 248 transmits, to the video control unit 242, information indicating that the above video signals can be transmitted.

Next, as shown in step S1004, when information indicating that the video signals can be transmitted from the external device 232 is received, the video display device 112 receives information indicating whether the reception tuner 254 of the external device 232 is available. A case where the reception tuner 254 is not available is, for example, a case where the reception tuner 254 is already in use. The already in-use condition is, for example, that the reception tuner 254 is being used for another purpose before the external device 232 transmits the video signal to the video display device 112, which is an object of the present embodiment. When the reception tuner 254 of the external device 232 is available, the control unit 248 transmits information, which indicates that the reception tuner 254 is available, to the video control unit 242.

As shown in step S1006, when the reception tuner 254 of the external device 232 is available, information indicating whether the power source is being supplied to the external device 232 is received. Firstly, the video control unit 242 transmits power source control information to the control unit 248. The power source control information described here is information that is transmitted from the video control unit 242 to the control unit 248 to request the control unit 248 to transmit information, which indicates whether the power source 258 of the external device 232 is being supplied, to the video control unit 242. Upon receiving the power source control information, the control unit 248 transmits power source control information to the power source information management unit 250 of the external device 232. Upon receiving the power source control information, the power source information management unit 250 transmits information, which indicates that the power source 258 is being supplied, to the control unit 248 when the power source 258 is being supplied. Then, the control unit 248 transmits information, which indicates that the power source 258 is being supplied, to the video control unit 242.

On the other hand, when the power source 258 is not being supplied to the external device 232, the power source information management unit 250, which acquires the power source control information, transmits information, which indicates that the power source 258 is not being supplied, to the control unit 248. The control unit 248 transmits the information, which indicates that the power source 258 is not being supplied, to the video control unit 242. Then, the video control unit 242 transmits information, which is for supplying the power source, to the control unit 248. Then, the control unit 248 transmits information, which is for supplying power source, to the power source information management unit 250. Upon receiving the information for supplying the power source, the power source information management unit 250 operates to supply the power source 258. When the power source 258 is supplied, the power source information management unit 250 transmits information, which indicates that the power source 258 is being supplied, to the control unit 248. Then, as described above, the control unit 248 transmits information, which indicates that the power source 258 is being supplied, to the video control unit 242.

Through the above steps S1000, S1002, S1004 and S1006, the video display device 112 can receive a video signal from the external device 232. Next, a method for the video display device 112 to receive a video signal from the external device 232 will be described.

(Method for Receiving Video Signal from External Device)

FIG. 6 is a flow showing a method in which the video display device 112 receives a video signal from the external device 232.

Firstly, as shown in step S1010, the video control unit 242 prepares a channel list. The channel list is, for example, recorded in the storage unit 246. The channel list may be previously recorded as a database in the storage unit 246. For example, the channel list may be a list transmitted from a broadcast station and recorded to the storage unit 246. Further, the user can create a channel list by operating the controller 108 and records the channel list to the storage unit 246. In this case, the video control unit 242 acquires the channel list from the storage unit 246. The channel list described here is channel information related to plural video signals, which can be displayed by the video display device 112. The channel information includes numbers, schedule, and frequency band of the respective channels, for example. On the other hand, as shown in step S1012, the external device 232 waits to be requested from the video display device 112 to transmit video signals.

Next, as shown in step S1014, the video display device 112 requests the external device 232 to transmit a video signal related to one of the channels based on the channel list. Then, as shown in step S1016, the external device 232 receives the request for the video signal. Concretely, the video control unit 242 transmits internal video information to the external device 232. The internal video information is internal video information which is transmitted from the video control unit 242 to the internal reception tuner 236 under the control of the UI control unit 158. Since the video control unit 242 transmits the internal video information to the control unit 248, the control unit 248 can transmit a video signal different from the internal video signal related to the internal video information to the video display device 112. The different video signal described here includes a video signal of a different channel. From the external device 232 having the control unit 248, a video signal of a channel different from the internal video signal related to the internal video signal being displayed on the video display device 112 is transmitted to the video display device 112. With this configuration, the video display device 112 can simultaneously display different videos in real time.

Next, as shown in step S1018, the external device 232 determines a video signal of a channel to be transmitted to the video display device 112. Concretely, the control unit 248 determines an external video signal to be received by the reception tuner 254 based on the received internal video information. Here, it is preferable that the internal video signal and the external video signal are different video signals. The different video signals are, for example, video signals of different channels. Since the internal video signal and the external video signal are different, the video display device 112 can simultaneously display different video signals in real time.

Further, the control unit 248 may determine which channel's video signal is to be received by internal reception tuner 236 after receiving the external video signal recorded in the external video signal storage unit 260. Concretely, the control unit 248 can determine a receivable video signal, referring to channel numbers and frequency bands of the respective channels of the external video signals received from the external video signal storage unit 260.

Next, as shown in step S1020, the external device 232 prepares to receive a video signal from the broadcast station. Concretely, the control unit 248 transmits external video information to the reception tuner 254. The external video information described here is video information related to an external video signal to be received by the reception tuner 254. The external video information includes a channel number, a channel frequency and the like.

As shown in step S1022, the reception tuner 254 receives an external video signal from the broadcast station.

Next, as shown in step S1024, the external device 232 transmits the external video signal to the video display device 112. Concretely, the reception tuner 254, which receives the external video signal, firstly transmits the external video signal to the control unit 248. Then, the control unit 248 transmits the video to the video transmission unit 256. Then, the video transmission unit 256 transmits the external video signal to the external tuner video reception unit 244. As shown in step S1026, the external tuner video reception unit 244 receives the external video signal from the video transmission unit 256.

As shown in step S1028, the video display device 112 can record the external video information related to the received external video signal. Concretely, the external tuner video reception unit 244 transmits the external video signal to the video control unit 242. Then, upon receiving the external video signal, the video control unit 242 transmits the external video information related to the external video signal to the video information recording unit 238. Then, the video information recording unit 238 can record the external video information in the storage unit 246. When the external video information is recorded in the storage unit 246, the video control unit 242 can create a channel list based on the external video information.

Next, as shown in step S1030, the video display device 112 can display the received external video signal. More concretely, upon receiving the external video signal, the video control unit 242 transmits the external video signal to the display control unit 234. When the external video signal is transmitted from the display control unit 234 to the display screen 230, the external video signal is displayed together with the internal video signal in real time on the display screen 230. The user can execute various operations such as changing channels while viewing plural videos displayed on the display screen 230. Then, as shown in step S1014, the video display device 112 again requests an external device 232, which is different from the above external device 232, to transmit a video signal related to one of the channels based on the channel list. The video display device 112 repeats this operation so that the acquired plural video signals can be simultaneously displayed in real time on the display screen 230. The plural video signals include external video signals and an internal video signal received by the internal reception tuner 236.

When plural video signals are displayed on the display screen 230 in this manner, it is preferable that the plural video signals are different video signals. Here, the different video signals include video signals of different channels. Since video signals of different channels are simultaneously displayed in real time, the user can easily select a program to view. Further, when displaying these plural video signals simultaneously in real time is realized without using plural tuners, this allows to keeps the manufacturing cost low and the user can purchase the video display device in a low cost.

6. APPLICATION EXAMPLES OF VIDEO DISPLAY METHOD

Referring to FIGS. 7 to 11, a display screen displaying videos of plural channels will be described.

(Display Condition of Plural Videos as Icons)

Figure 7:
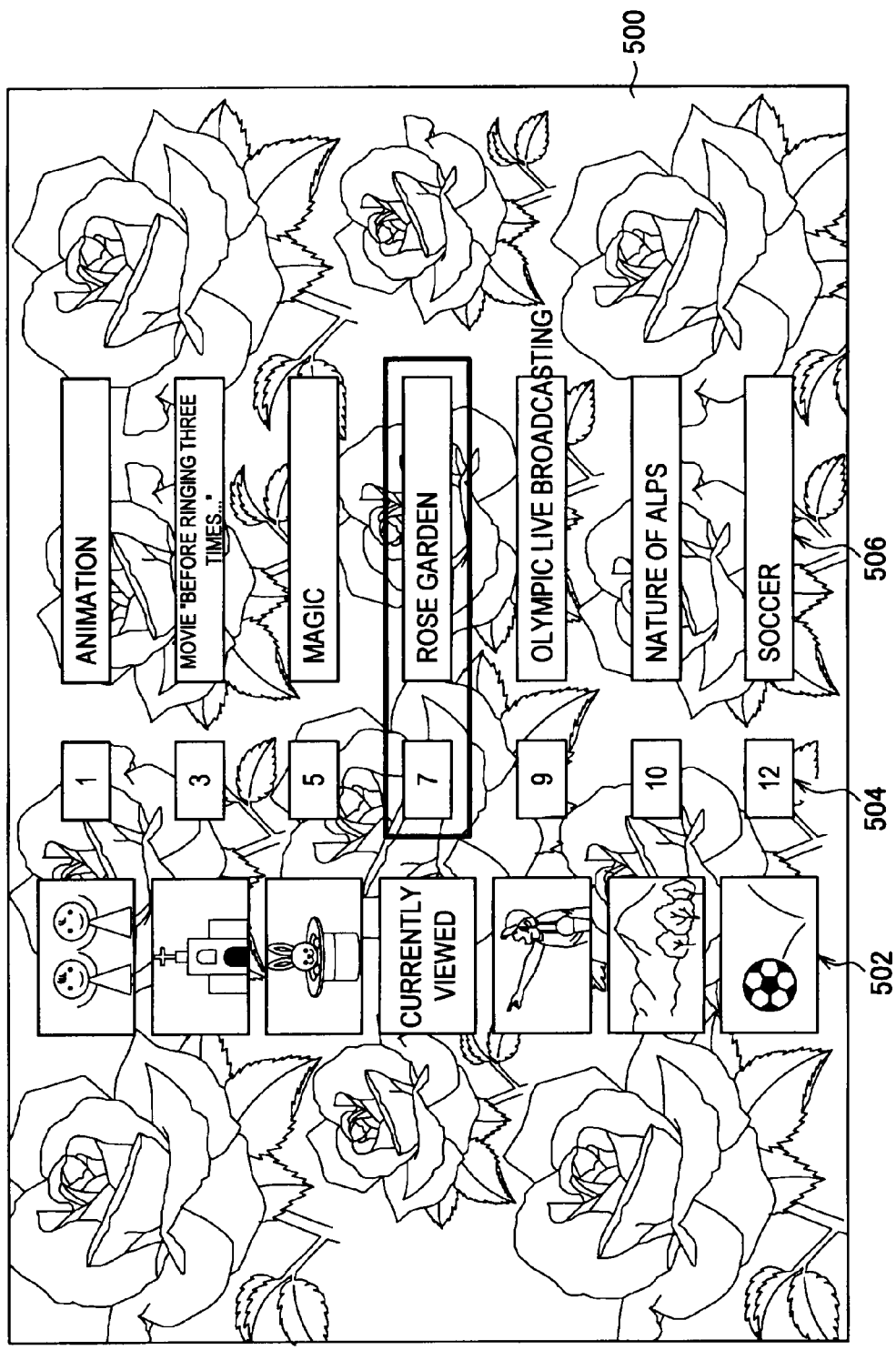
FIG. 7 is an explanatory diagram showing a condition how plural videos are displayed in real time on the video display device according to the embodiment.

FIG. 7 is an explanatory diagram showing an example of video signals displayed on the display screen 230. FIG. 7 shows a video signal 500 displayed on the entire screen, video signals 502 of plural channels as icons, channel numbers 504 and program titles 506. The video signals 502 show seven video signals of the respective channels. The channel numbers 504 show seven channel numbers. The program titles 506 show seven titles of the respective channels. As described above, the video signal 500 displayed on the entire screen and the video signals 502 of plural channels are constituted of the internal video signal received by the video display device 112 via the internal reception tuner 236 and the external video signals received by the video display device 112 via the plural external devices 232.

For example, the video signal 500 is the internal video signal and the plural video signals 502 shown as icons are the external video signals. However, the video signal 500 may be one of the plural external video signals and the plural video signals 502 shown as icons may be the internal video signal and plural external video signals. Hereinafter, a case where the video signal 500 is the internal video signal and the plural video signals 502 shown as icons are external video signals will be described.

Firstly, a method for displaying video signals displayed on the display screen 230 shown in FIG. 7 will be described. The user transmits an operation signal to the UI control unit 158 using the controller 108. Then, the UI control unit 158 transmits the operation signal to the video control unit 242. The operation signal described here includes a signal regarding a channel number related to the video signal being displayed on the display screen 230, as shown in FIG. 7. As a concrete operation, for example, the user firstly presses the power key 1030 of the controller 108. Next, the user presses one of the terrestrial broadcast key 1012, the BS key 1014 and the CS key 1040 of the controller 108. Then, the user presses a desired channel number by using the BS ten-key 1044 or the terrestrial broadcast ten-key 1050. In the example shown in FIG. 7, when the user presses the channel number of "7," the user can view the video signal 500. For example, by executing these operations, the user can transmit operation signals to the UI control unit 158.

Based on the operation signals received by the UI control unit 158, the video control unit 242 transmits video information related to the video signal of a channel to be acquired to the internal reception tuner 236 (hereinafter, referred to as internal video information). The video information described here includes a channel number of the video signal. The channel to be acquired includes a broadcast and channel desired by the user. Next, the internal reception tuner 236 receives a video signal from a broadcast station based on the video information. Then, the internal reception tuner 236 transmits the received video signal (hereinafter, referred to as internal video signal) to the display control unit 234. When the internal video signal is transmitted to the display screen 230, the video signal is displayed on the display screen 230.

The video signal 500 is the internal video signal received by the internal reception tuner 236 from the broadcast station. On the other hand, the video signal 502 is the external video signals received from the plural external devices 232. A method for receiving the external video signals from the plural external devices 232 and displaying the signals on the display screen 230 will be described. Firstly, as has been described with reference to FIG. 6, the video control unit 242 transmits video reception control information to the control unit 248. The control unit 248 transmits information, which indicates that the external device 232 is available, to the video control unit 242.

Then, the control unit 248 transmits information, which indicates that video signals can be transmitted, to the video control unit 242. Then, the control unit 248 transmits information, which indicates that the power source 258 is being supplied, to the video control unit 242. After that, the video control unit 242 transmits internal video information to the external device 232. The internal video information is internal video information transmitted from the video control unit 242 to the internal reception tuner 236 under the control of the UI control unit 158. In other words, the internal video information shown in FIG. 7 is video information related to the video signal 500. Since the video control unit 242 transmits the internal video information to the control unit 248, the control unit 248 can transmit a video signal different from the internal video signal related to the internal video information to the video display device 112. The different video signal described here includes a video signal of a different channel. Since the video of a channel different from the internal video signal related to the internal video being displayed on the video display device 112 is transmitted from the external device 232 having the control unit 248 to the video display device 112, the video display device 112 can simultaneously display different videos in real time.

Further, the video display device 112 receives an external video signal from a second external device 232, which is different from the above external device 232 (hereinafter, referred to as first external device 232). Firstly, similarly to the first external device 232, the video display device 112 receives, from the second external device 232, information indicating that the second external device 232 is available, information indicating that the video signal is transmittable and information indicating that the power source 258 is being supplied. After that, a method for receiving the external video signal is the same as the above described method for receiving the external video signal from the first external device 232. Note that the information transmitted from the video control unit 242 to the control unit 248 is not limited to the above described internal video information.

The information transmitted from the video control unit 242 to the control unit 248 includes external video information (hereinafter, referred to as first external video information) related to the external video signal (hereinafter, referred to as first external video signal) transmitted from the control unit 248 of the first external device 232 to the video control unit 242. With this configuration, the control unit 248 of the second external device 232 receives the internal video information and the first external video information. This allows the control unit 248 to transmit video information so that the reception tuner 254 can receive an external video signal, after referring to the internal video information and the first external video information. Thus, the channel number included in the video information can be different form the channel numbers included in the internal video information and the first external video information respectively. Then, the video display device 112 receives an external video signal (hereinafter, referred to as second external video signal) from the second external device 232. Thus, the internal video signal, the first external video signal and the second external video signal are all different video signals.

Further, the video display device 112 also receives an external video signal (hereinafter, referred to as third external video signal) from a third external device 232. As described above, the control unit 248 of the third external device 232 can transmit external video information to the reception tuner 254 after referring to the internal video information, the first external video information, and the second external video information. Thus, the third external video signal, which is received by the reception tuner 254 of the third external device 232 and transmitted to the video display device 112, can be different from the internal video signal, the first external video signal, and the second external video signal.

A case where the video display device 112 receives an external video signal from "N" number of external devices 232 (N is an integer that is equal to or greater than 2) will be described. The external device 232 transmits, as an "a"th external device 232, an external video signal to the video display device 112. The external device 232 can refer to external video information related to "(a−1)" number of external video signals, which are previously transmitted to the video display device 112, when receiving the external video signal from a broadcast station ("a" is a natural number which is equal to or less than "N"). The external device 232 can also refer to the internal video information. Thus, the external device 232, which transmits, as the "a"th external device 232, the external video signal to the video display device 112, can transmit an external video signal different from the external video signals previously transmitted to the video display device 112. In other words, the external video signals received by the video display device 112 from "N" number of external devices 232 and the internal video signal are respectively different video signals.

Since the video display device 112 receives plural external video signals in the above described flows, it is possible to display different external video signals in real time together with the internal video signal as shown in the example of FIG. 7. In the example of FIG. 7, the video display device 112 displays the external video signals as icons. The icons described here can be used as objects used to select channels. Thus, for example, the user can operate the controller 108 and moves the cursor and the like so that the user can select a preferable channel to view subsequently among the icons. In this case, when video signals of icons serving as channel selection objects are displayed in real time together with the internal video signals as described in the present embodiment, the user can select a channel after recognizing the details of video signals being currently displayed in the respective channels.

Further, in the example of FIG. 7, the icon related to the video signal 500 being displayed on the entire display screen 230 is shown as "Currently viewed." This allows the user to select a program to view subsequently while recognizing the video information related to the video signal which is currently viewed. The icon related to the video signal 500 which is currently viewed does not have to be always displayed as "Currently viewed." Further, the icons can be scrolled on the display screen.

Figure 8:
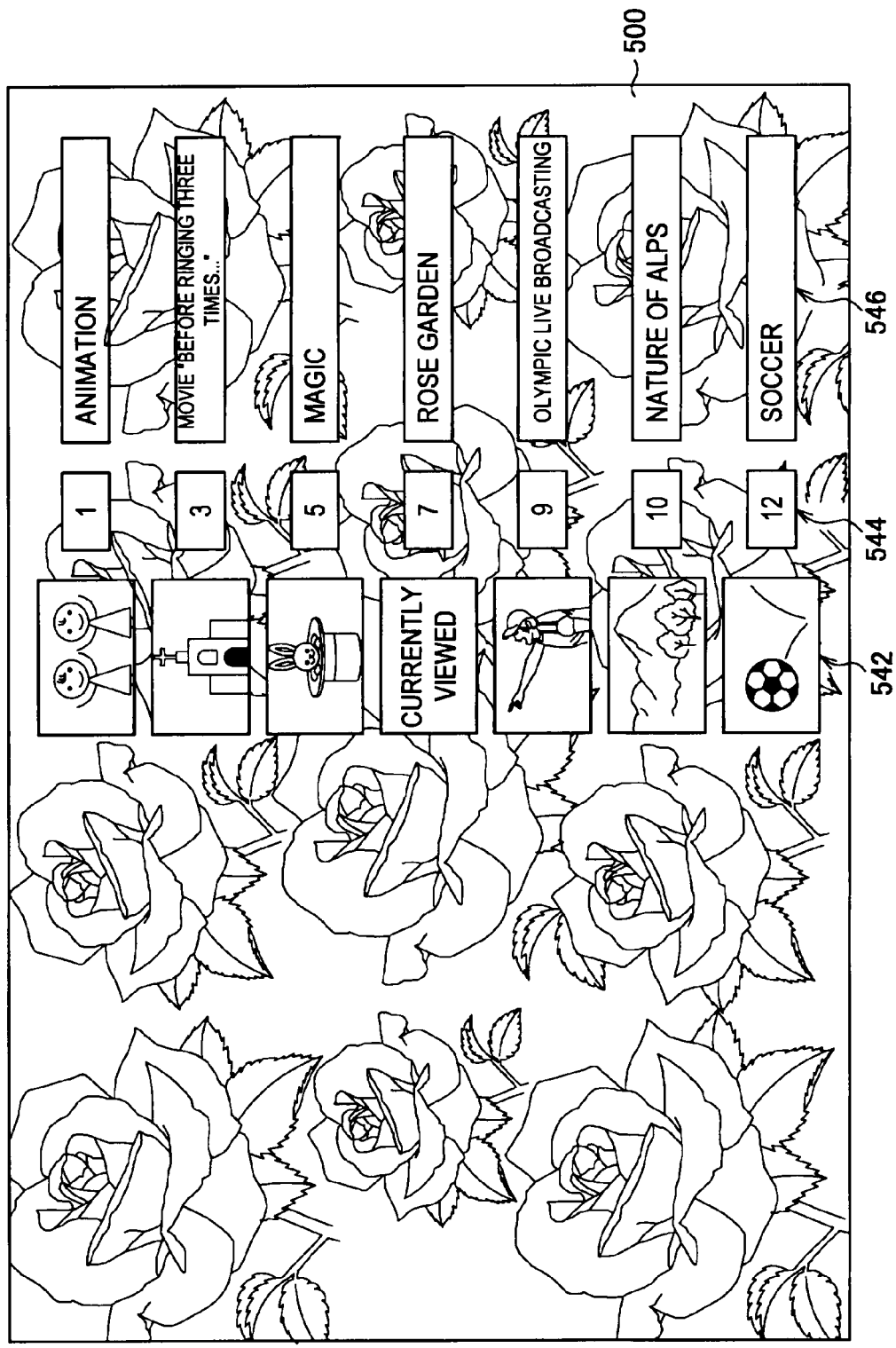
FIG. 8 is an explanatory diagram showing a condition how plural videos are displayed in real time on the video display device according to the embodiment.

FIG. 8 is an explanatory diagram showing another example of the video signals displayed on the display screen 230. FIG. 8 shows a video signal 500 displayed on the entire screen, video signals 542 of plural channels shown as icons, channel numbers 544 and program titles 546. The video signals 542 show seven video signals of the respective channels. The channel numbers 544 show seven channel numbers. The program titles 546 show seven titles of the respective channels.

Compared with the example shown in FIG. 7, in the example shown in FIG. 8, the video signal 542 is located closer to one side of the display screen 230. In this manner, the positions where the video signals 542 of plural channels shown as icons are located may be any position on the display screen 230. The positions can be determined by user's operations of the controller 108 according to the preference and recorded in the storage unit 246 of the video display device 112.

Figure 9:
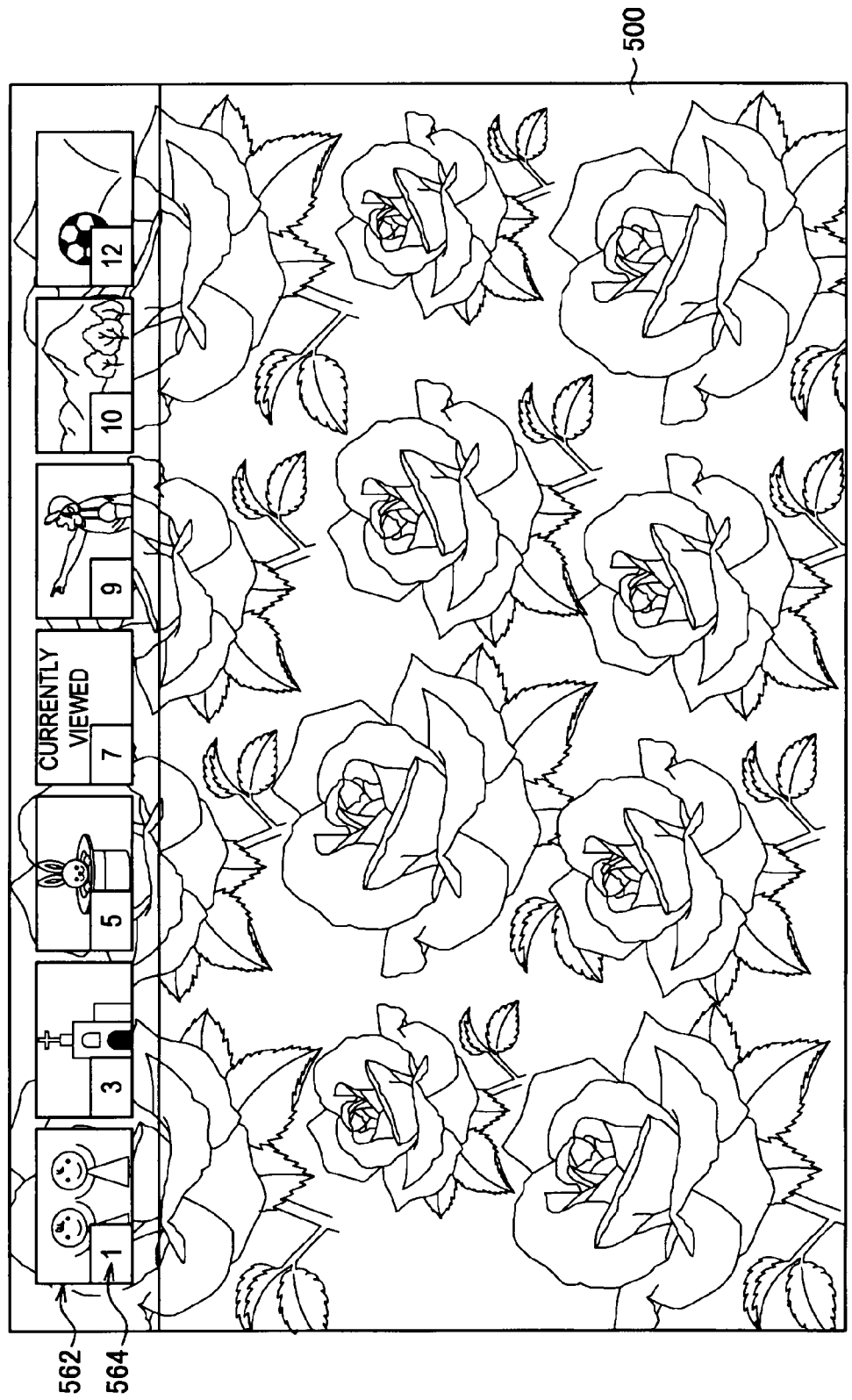
FIG. 9 is an explanatory diagram showing a condition how plural videos are displayed in real time on the video display device according to the embodiment.

FIG. 9 is an explanatory diagram showing still another example of the video signals displayed on the display screen 230. FIG. 9 shows a video signal 500 displayed on the entire screen, video signals 562 of plural channels shown as icons and channel numbers 564. The video signals 562 show seven video signals of the respective channels. The channel number 564 shows seven channel numbers.

As has been described with reference to FIGS. 7 and 8, the plural video signals shown as icons can be located at any position on the display screen 230. Compared with the examples shown in FIGS. 7 and 8, in the example shown in FIG. 9, the area ratio of the video signals 562 of plural channels shown as icons occupying on the display screen 230 is low. This lowers the ratio of the area that the video signals 562 hide the video signal 500 so that the user can select a program to view subsequently while viewing the currently displayed video signal.

(Display Condition of Plural Videos Displayed on Split Screen)

Figure 10:
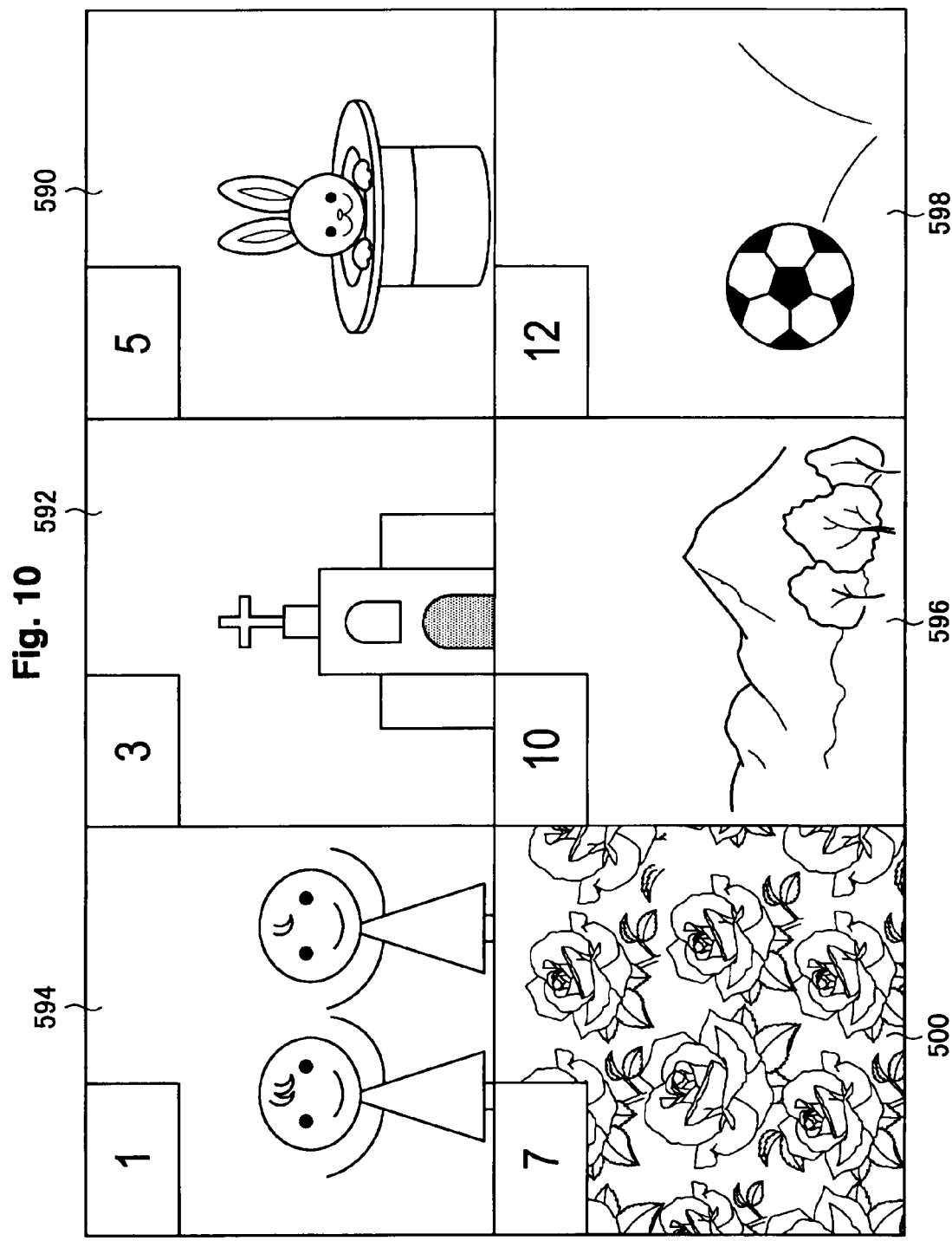
FIG. 10 is an explanatory diagram showing a condition how plural videos are displayed in real time on the video display device according to the embodiment.

FIG. 10 is an explanatory diagram showing still another example of the video signals displayed on the display screen 230. The external video signals do not always have to be displayed as icons as described in the examples shown in FIGS. 7, 8 and 9, and may be displayed as shown in FIG. 10. In the example shown in FIG. 10, the video signals of the respective channels are displayed on the display screen 230 by splitting the screen. For example, regarding recent commercially-available large-size display screens, even if the video signals of the respective channels are displayed on a split screen, the user can comfortably view the video signals of the respective channels thanks to the size of the screen. Then, when the video signals of the respective channels are displayed on a split screen, the user can view plural video signals at a time and acquire plural pieces of information.

(Condition of Displaying Plural Videos with Broadcast Time Periods)

Figure 11:
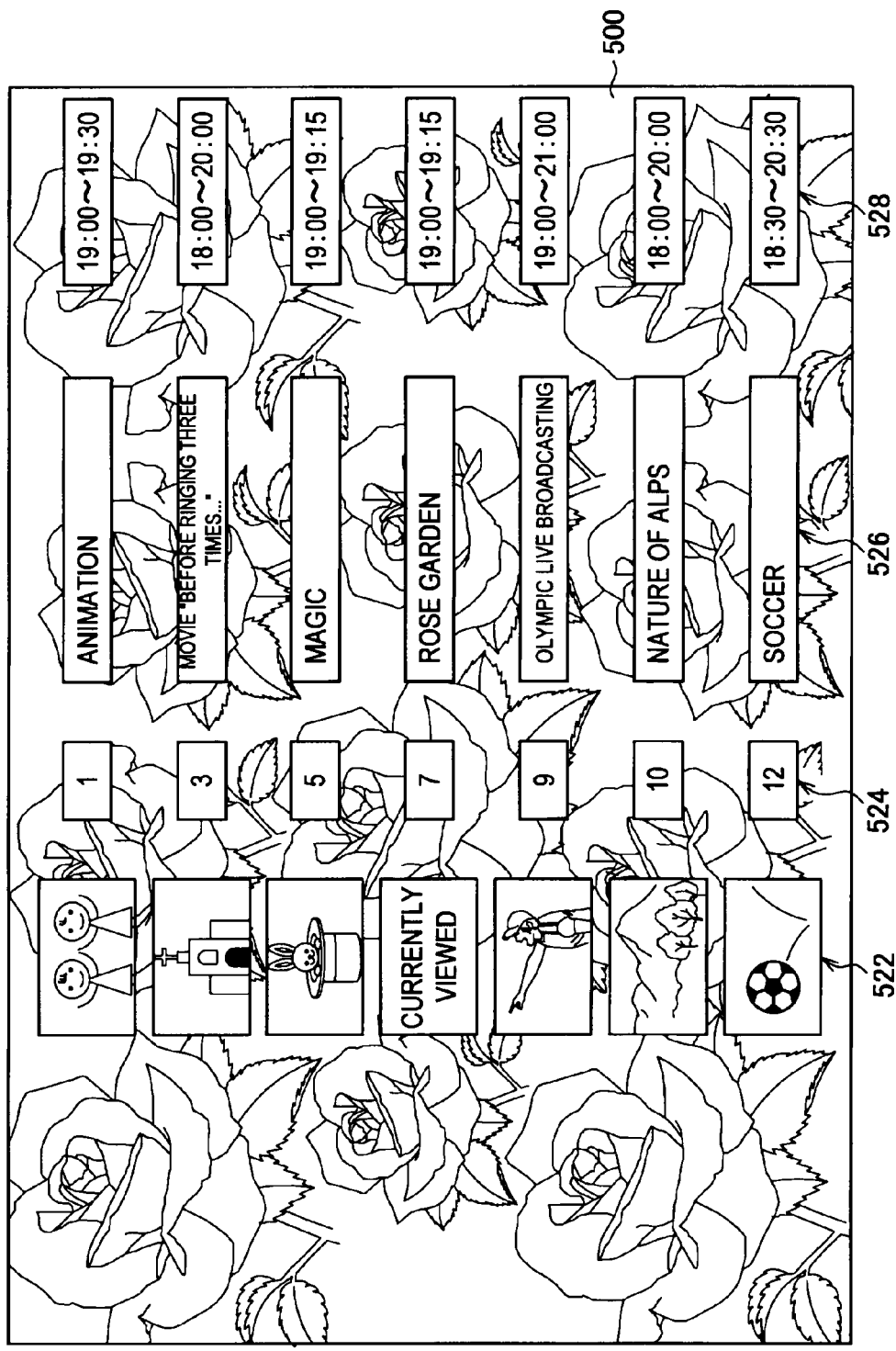
FIG. 11 is an explanatory diagram showing a condition how plural videos are displayed in real time on the video display device according to the embodiment.

FIG. 11 is an explanatory diagram showing still another example of the video signals displayed on the display screen 230. FIG. 11 shows a video signal 500 displayed on the entire screen, video signals 522 of plural channels shown as icons and channel numbers 524. FIG. 11 further shows broadcast time periods 528 of programs related to the currently displayed video signals 522.

Unlike the examples shown in FIGS. 7, 8, and 9, in the example shown in FIG. 11, broadcast time periods of programs related to the currently displayed video signals of the respective channels are displayed. The user can recognize broadcast time periods of those programs while viewing the video signals of the currently broadcasted programs of the respective channels. Thus, the user can recognize the broadcast time period of desired program without checking program schedules of newspapers or magazines, for example.

(Display Condition where Program Schedule is Added to Plural Videos Shown as Icons)

Figure 12:
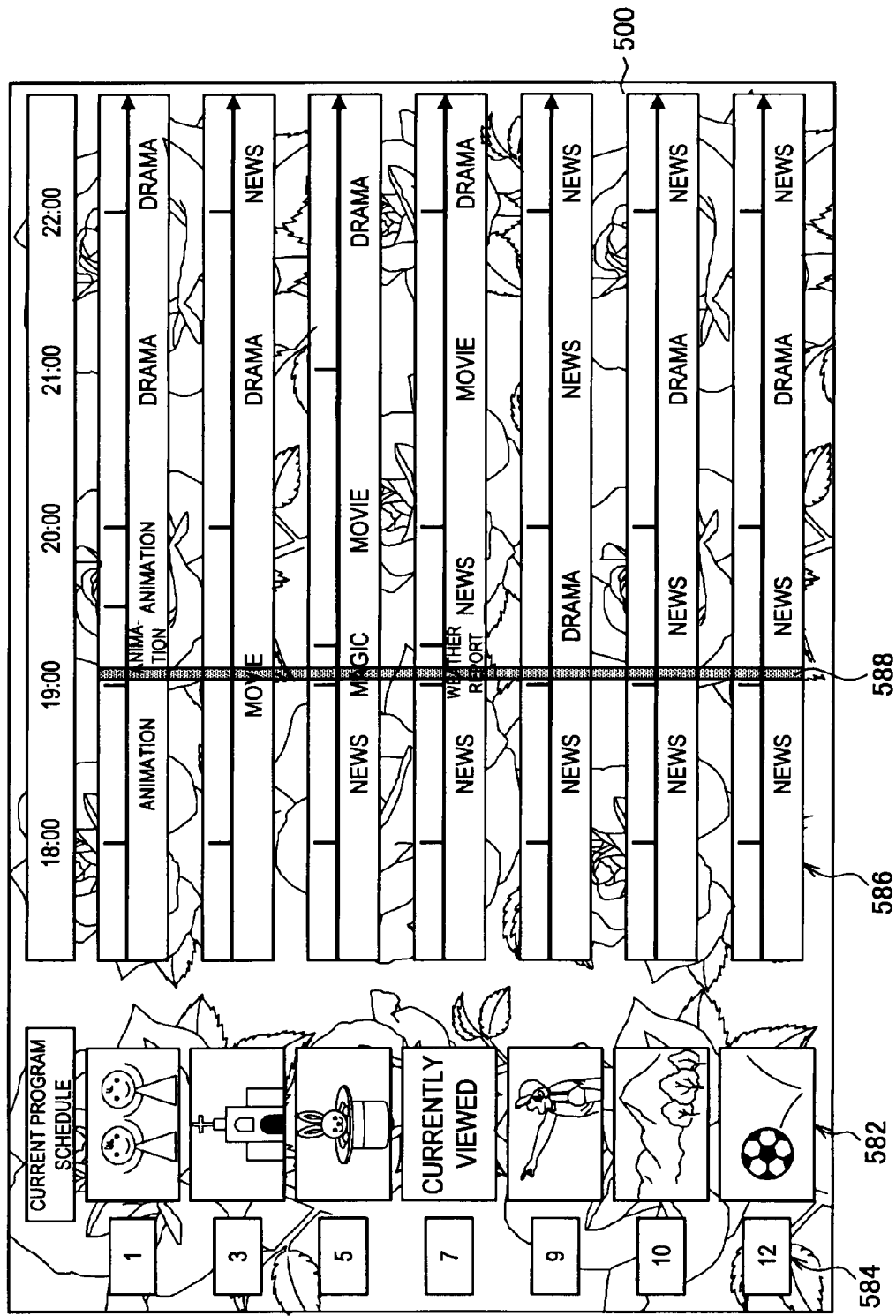
FIG. 12 is an explanatory diagram showing a condition how plural videos are displayed in real time on the video display device according to the embodiment.

FIG. 12 is an explanatory diagram showing still another example of the video signals displayed on the display screen 230. FIG. 12 shows a video signal 500 displayed on the entire screen, video signals 582 of plural channels shown as icons and channel numbers 584. FIG. 12 further shows a program schedule 586 of a time zone which is close to the present time. The video signals 582 show seven video signals of the respective channels. The channel numbers 584 show seven channel numbers. The program titles 586 show seven titles of the respective channels.

Unlike the examples shown in FIGS. 7, 8, 9 and 11, in the example shown in FIG. 12, the program schedules 586 of the respective channels in a time zone close to the present time are displayed. Thus, the user can recognize broadcast time periods of desired programs without checking program schedules of newspapers or magazines, for example. Further, a bar 588 indicates the present time so that the user can recognize the title of the program which is currently viewed based on the program schedule 586.

Referring to FIGS. 7 to 12, a method for displaying plural video signals, which can be displayed on the video display device 112 according to the present embodiment, has been described. The display condition of the plural video signals can be selected, for example, by the user among the above described display condition or other display conditions. The user can select the display condition by operating the controller 108. The video display device 112 may include plural display conditions as a database so that the user can select a display condition by pressing the menu key 1010. Further, the video display device 112 may be set so that the user can create a display condition by themselves by operating the controller 108. Further, the video display device 112 may be set so that the video display device 112 receives video signals form the external devices 232 as described above according to a user's determination regarding which display condition is used to display the plural video signals.

(Display of Reception Condition Setting of Video Signal from External Device 232)

Figure 13:
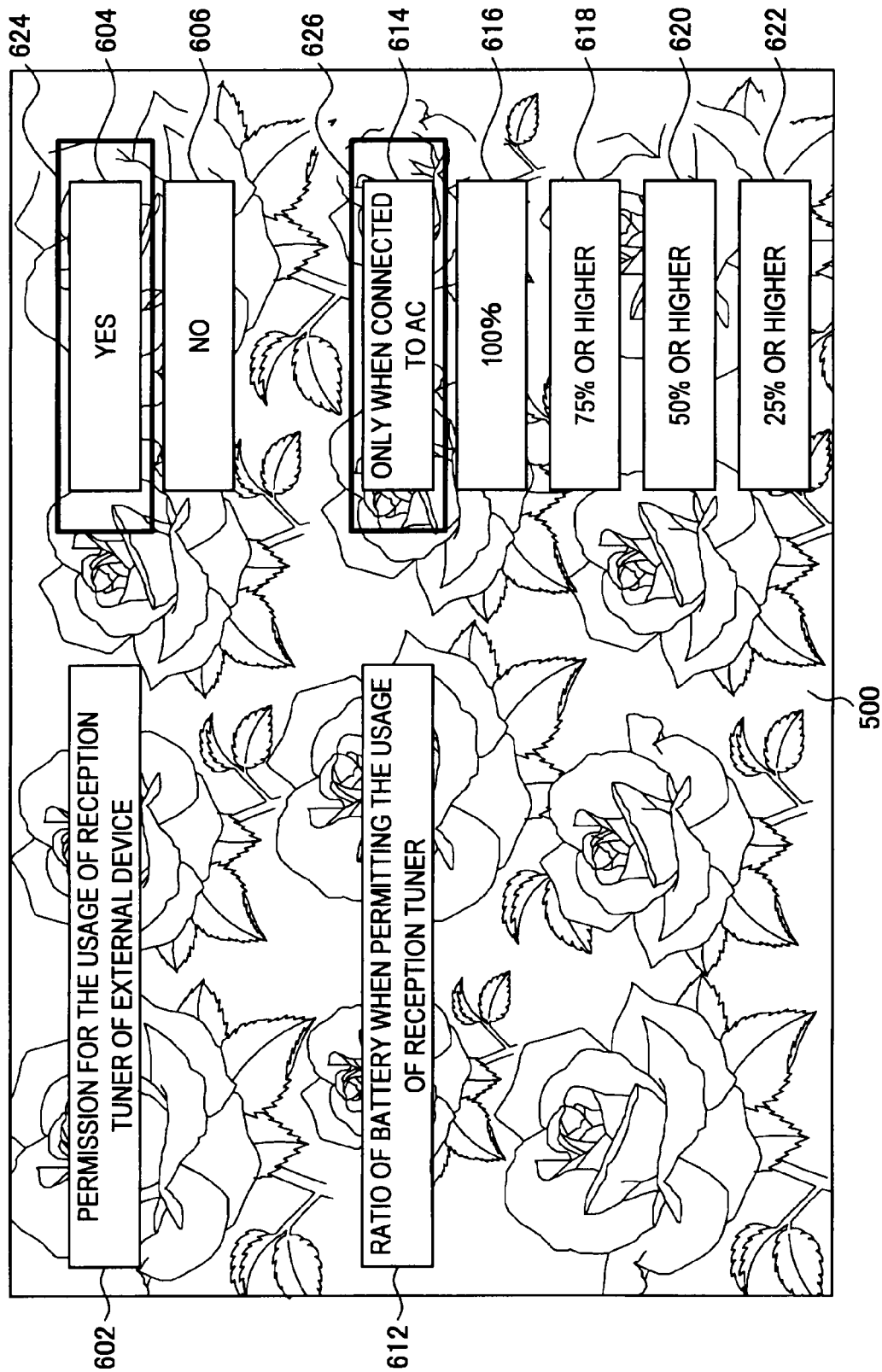
FIG. 13 is an explanatory diagram showing a condition of enabling/disenabling a reception of a video signal from an external device in the video display device according to the embodiment.

FIG. 13 shows a display regarding a reception condition setting when the video display device 112 receives a video signal from the external device 232. In the example shown in FIG. 13, firstly, options related to an "Permission for the usage of reception tuner of external device 232" 602 are shown. To set the video display device 112 to receive videos using the reception tuner 254, the user selects a "Yes" 604. On the other hand, to set the video display device 112 not to receive videos using the reception tuner 254, the user selects a "No" 606. The above selection can be executed, for example, when the user operates the controller 108, moves the cursor 624 using the direction key 1060, and presses the enter key 1062.

Further, in the example shown in FIG. 13, options related to a "Ratio of battery usage when permitting the usage of reception tuner" 612 are shown. When the external device 232 is driven by a battery and the video display device 112 receives video signals from the external device 232, the "Ratio of battery when permitting the usage of reception tuner" 612 can be displayed on the display screen 230 of the video display device 112. The user can select an "only when connected to AC" 614 to permit the usage of the reception tuner only when the external device 232 is connected to an AC power. Further, the user can select a "100%" 616 to permit the usage of the reception tuner only when the remaining battery level of the external device 232 is 100%. Further, the user can select a "75% or higher" 618 to permit the usage of the reception tuner when the remaining battery level of the external device 232 is equal to or greater than 75% and less than 100%. Further, the user can select a "50% or higher" 620 to permit the usage of the reception tuner when the remaining battery level of the external device 232 is equal to or greater than 50% and less than 75%. Further, the user can select a "25% or higher" 622 to permit the usage of the reception tuner when the remaining battery level of the external device 232 is equal to or greater than 25% and less than 50%.

7. CONCLUSION

The functional configuration of the video display device of the present embodiment and operations and effects obtained from the functional configuration will be briefly summarized.

Firstly, the functional configuration of the video display device 112 according to the present embodiment can be described as follows. The video display device 112 includes an external tuner video reception unit 244, an internal reception tuner 236, a video control unit 242 and a display control unit 234.

The external tuner video reception unit 244 is configured to receive, from an external device having a reception tuner for receiving video signals, a video signal (hereinafter, referred to as external video signal) received by the reception tuner. In this manner, the external tuner video reception unit 244 receives a video signal from the external device 232. The video signal is received by a reception tuner 254 of the external device 232 and then received by the external tuner video reception unit 244. As the external device 232, there are a digital video recorder and a digital DVD recorder, for example.

The internal reception tuner 236 is configured to receive a video signal (hereinafter, referred to as an internal video signal). In other words, the video display device 112 according to the present embodiment can display the external video signal and the internal video signal. More concretely, the display control unit 234 can simultaneously display the external video signal and the internal video signal in real time. By using a tuner of the external device, the user can simultaneously display plural video signals in real time even when the video display device 112 does not have the same number of tuners as the number of video signals to be displayed. Since the video display device 112 does not have to include plural tuners, an increase of the manufacturing cost for providing plural tuners can be prevented. Thus, the user can obtain a video display device capable of simultaneously displaying plural video signals in real time in low cost.

The plural video signals simultaneously displayed in real time may be displayed as objects used for selecting channels. The plural video signals can be displayed as so-called icons. Since the plural video signals simultaneously displayed in real time are displayed as objects for selecting channels, the user can select a program to view while checking program contents broadcasted in the respective channels.

The video control unit 242 operates so that the external tuner video reception unit 244 acquires video signals. Further, the video control unit 242 can transmit, to the external device 232, video reception control information for checking whether the external video signals are receivable from the external device 232. Then, upon receiving information indicating that the video signals are receivable from the external device 232 after the transmission of the information, the video control unit 242 can operate so that the external tuner video reception unit 244 receives video signals of the respective channels. Thus, the video display device 112 can receive external video signals selectively from an external device from which external video signals are receivable. The case where the video display device 112 can not receive video signals from the external device 232 is, for example, a case where the external video signals are not receivable because the reception tuner 254 of the external device 232 is under fault conditions. Thus, when the reception tuner 254 of the external device 232 from which the video display device 112 is about to receive video signals is under fault conditions, the video display device 112 can receive external video signals selectively from another reception tuner 254 of the external device 232, which is working properly.

Further, when the video control unit 242 receives power source information indicating whether the power source 258 is being supplied to the external device 232 from the external device 232, the video control unit 242 may receive power source information indicating that the power source 258 is not being supplied to the external device 232. In this case, the video control unit 242 can operate to supply power source 258 to the external device 232. Thus, even when the power source 258 is not being supplied to the external device 232, the power source 258 is supplied without user's operation to supply the power source 258 so that the video display device 112 can receive video signals from the external device 232.

Further, the video control unit 242 can reduce the number of frames of video signals received by the external tuner video reception unit 244 as the transmission and reception rate between the video display device 112 and the external device 232 lowers. Thus, the video display device 112 can display the video signals in real time while reducing the number of frames to be received, even when the reception rate from the external device 232 is slower than normal rate. Further, the normal rate described here is a rate that the video display device 112 can receive external video signals from the external device 232 and display all frames of the external video signals in real time. When the rate is slower than the normal rate, the video display device 112 may not receive external video signals from the external device 232 and display the signals in real time.

In addition, the functional configuration of a video display device system of the present embodiment and operation and effect obtained by the functional configuration will briefly be summarized below.

Firstly, the functional configuration of a video display device system according to the present embodiment can be described as follows. The video display device system includes a video display device and an external device.

The video display device 112 includes an external tuner video reception unit 244, an internal reception tuner 236, a video control unit 242 and a display control unit 234. Further, the external device 232 includes a control unit 248 and a video transmission unit 256.

Further, the control unit 248 receives video information related to a video signal from the video control unit 242. Further, upon receiving the information, in the control unit 248, the video transmission unit 256 transmits an external video signal of a channel different from the internal video signal of the channel received by the internal reception tuner 236 to the external tuner video reception unit 244. Thus, the video display device 112 can simultaneously display different video signals in real time.

Further, the video display device 112 can receive video signals from plural external devices 232 including at least a first external device 232 and a second external device 232. In this case, it is preferable that the external video signal transmitted from a video transmission unit 256 of the first external device 232 and external video signal transmitted from the second external device 232 are different. Thus, the video display device 112 can simultaneously display plural different video signals including an internal video signal in real time. As a result, the user can simultaneously view plural different video signals in real time. Further, when the plural different video signals are displayed as icons, the user can select a desired program while viewing the current broadcasted content of the program.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-301446 filed in the Japan Patent Office on 26 Nov. 2008, the entire content of which is hereby incorporated by reference.

What is claimed is:

1. A video display device comprising:
    an external tuner video reception unit that receives, from an external device including a reception tuner to receive a video signal, a video signal received by the reception tuner of the external device, the external device being separate from the video display device;
    an internal reception tuner that receives a video signal corresponding to a channel;
    a video control unit that transmits information corresponding to the video signal received by the internal reception tuner to the external device, and controls the external tuner video reception unit to receive a video signal of each channel from the external device, the video signal of each channel being different from the channel corresponding to the video signal received by the internal reception tuner; and
    a display control unit that controls simultaneous real-time display of a video signal received by the external tuner video reception unit and the video signal received by the internal reception tuner as icons on a screen in a list of channel information corresponding to each of the channels from the external device and the channel of the internal reception tuner, each row in the list including a channel number, a corresponding icon and a corresponding program title.

2. The video display device according to claim 1, wherein the video signal received in real time by the external tuner video reception unit and the video signal received by the internal reception tuner, which are displayed as icons on the screen, are used to select a channel on the screen.

3. The video display device according to claim 2, wherein the video control unit transmits video reception control information for checking whether a video signal is receivable from the external device and, after receiving information that the video signal can be received from the external device, controls to receive the video signal of each channel.

4. The video display device according to claim 3, wherein the video control unit receives power source information indicating whether power source is being supplied to the external device from the external device, and, when power source information indicating that the power source is not being supplied to the external device is received, the video control unit controls to supply the power source to the external device.

5. The video display device according to claim 4, wherein when transmission and reception rate to and from the external device is lowered, the video control unit reduces the number of frames of the video signals to be received via the external tuner video reception unit.

6. A video display system comprising:
    a video display device including
    an external tuner video reception unit that receives, from an external device including a reception tuner to receive a video signal, a video signal received by the reception tuner,
    an internal reception tuner that receives the video signal corresponding to a channel,
    a video control unit that transmits information corresponding to the video signal received by the internal reception tuner to the external device, and controls the external tuner video reception unit to receive a video signal of each channel from the external device, the video signal of each channel being different from the channel corresponding to the video signal received by the internal reception tuner, and a display control unit that simultaneously displays in real time the video signal received by the external tuner video reception unit and the video signal received by the internal reception tuner as icons on a screen in a list of channel information corresponding to each of the channels from the external device and the channel of the internal reception tuner, each row in the list including a channel number, a corresponding icon and a corresponding program title; and the external device including a control unit that receives video information related to the video signal received by the internal reception tuner from the video control unit, and a video transmission unit that transmits a video signal corresponding to different channels from the channel corresponding to the internal reception tuner to the external tuner video reception unit.

7. The video display system according to claim 6, wherein the video display device receives different video signals from plural external devices, respectively.

8. A video display method comprising:

receiving a video signal at an internal reception tuner, the video signal corresponding to a channel;

transmitting information regarding the video signal received by the internal reception tuner to an external device;

receiving in real time, from the external device including a reception tuner to receive a video signal, a video signal of each channel received by the reception tuner of the external device that is different from the channel corresponding to the video signal received by the internal reception tuner;

simultaneously displaying in real time the video signal received from the external device and the video signal received by the internal reception tuner as icons on a screen in a list of channel information corresponding to each of the channels from the external device and the channel of the internal reception tuner, each row in the list including a channel number, a corresponding icon and a corresponding program title.

9. The video display system according to claim 1, wherein at least one of the video signal received by the external tuner video reception unit and the video signal received by the internal reception tuner is a digital broadcast signal.

10. The video display system according to claim 1, wherein at least one of the video signal received by the external video reception unit and the video signal received by the internal reception unit is an analog broadcast.

11. The video display device according to claim 1, wherein the video control unit transmits an authentication signal to the external device, the authentication signal indicating that the video display device is authorized to receive the video signal received by the external video reception unit.

* * * * *